(12) United States Patent
Diaz De Corcuera et al.

(10) Patent No.: US 8,360,398 B2
(45) Date of Patent: Jan. 29, 2013

(54) DEVICE FOR HANDLING A WIND TURBINE ROTOR BLADE AND A METHOD FOR HANDLING WIND TURBINE ROTOR BLADES

(75) Inventors: Sebastien Diaz De Corcuera, Osnabrück (DE); Lars Davideit, Hasbergen (DE); Christoph Lammen, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/211,978

(22) Filed: Aug. 17, 2011

(65) Prior Publication Data

US 2012/0032125 A1   Feb. 9, 2012

(51) Int. Cl.
  *B25B 11/00* (2006.01)
(52) U.S. Cl. .................. 254/131; 254/134; 29/281.1
(58) Field of Classification Search .................. 254/131, 254/134, DIG. 14; 269/91–95, 291, 71, 228, 269/131; 29/281.1
See application file for complete search history.

(56) References Cited

U.S. PATENT DOCUMENTS

| 5,174,004 | A  | * | 12/1992 | King et al. ..................... 29/251 |
| 7,726,941 | B2 |   | 6/2010  | Bervang |
| 7,900,898 | B2 | * | 3/2011  | Wampler, II .................. 269/152 |
| 2010/0018055 | A1 |   | 1/2010  | Lynderup et al. |
| 2010/0158654 | A1 |   | 6/2010  | Willim |
| 2012/0032125 | A1 | * | 2/2012  | Diaz De Corcuera et al. ............................ 254/131 |

FOREIGN PATENT DOCUMENTS

| EP | 1826401 A2 | 8/2007 |
| WO | 2008/132226 A1 | 11/2008 |
| WO | 2009/112887 A1 | 9/2009 |

* cited by examiner

*Primary Examiner* — Lee D Wilson
(74) *Attorney, Agent, or Firm* — Global Patent Operation; Douglas D. Zhang

(57) ABSTRACT

A device for handling a rotor blade of a wind turbine is provided. The device includes a frame which defines an inner space for at least partially accommodating the rotor blade. The device further includes a blade support which is arranged in the inner space and mounted to the frame, and a first lever arm. The first lever arm is pivotably mounted to the frame and includes a retaining end arranged in the inner space and an actuator end which is movable to rotate the first lever arm so that the rotor blade is retained between the blade support and the retaining end.

20 Claims, 17 Drawing Sheets

DEVICE FOR HANDLING A WIND TURBINE ROTOR BLADE AND A METHOD FOR HANDLING WIND TURBINE ROTOR BLADES

BACKGROUND OF THE INVENTION

The subject matter described herein relates generally to methods and systems for handling wind turbine rotor blades and mounting said rotor blades on a wind turbine, and more particularly, to a handling device for lifting and aligning said rotor blades, for example with a crane, and to related methods.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity.

Modern wind turbines typically have a rotor with a considerable diameter and weight. The diameter of modern rotors may be larger than 120 meters and the weight of the rotor including a wind turbine hub and, for example, three wind turbine blades may add up to 50 tons or more. Accordingly, mounting of wind turbine typically requires expensive work equipment and the duration of the assembly period is a significant cost factor, in particular for off-shore wind turbines. Mounting the wind turbine could include the steps of transporting the different elements to the site of the wind turbine, assembling the tower sections and/or erecting the tower on ground or on a floating platform, pre-mounting the wind turbine hub on the nacelle, lifting the wind turbine nacelle with a crane and mounting the nacelle on the top of the tower. Thereafter, the blades may be successively fastened to a hook block of the crane by means of ropes or a holding apparatus, lifted to a position next to and mounted to the hub.

Due to the large exposed surface of the rotor blades, even small gusts of wind may have a large effect on the position of the rotor blade during lifting. Since wind turbines are installed in regions which are particularly exposed to wind, raising the blades into their assembly position may be tedious.

For blade mounting, the rotor blade is typically fastened to the hub with a large number of screws or bolts protruding out of a root section of the rotor blade. Prior to fastening, the rotor blade is typically to be aligned exactly to a bearing surface and to a pattern of holes in the hub. When the rotor blade approaches its assembly position, special care is typically to be taken to avoid that the bolts damage the rotor and/or the nacelle, which are typically made of a composite.

All this typically causes substantial time losses, which increase the assembly period and thus the costs for manpower and the expensive work equipment.

In view of the above, there is a desire for methods and tools that allow for reducing mounting time of wind turbine rotor blades.

BRIEF DESCRIPTION OF THE INVENTION

In one aspect, a device for handling a rotor blade of a wind turbine is provided. The device includes a frame which defines an inner space for at least partially accommodating the rotor blade. The device further includes a blade support which is arranged in the inner space and mounted to the frame, and a first lever arm. The first lever arm is pivotably mounted to the frame and includes a retaining end arranged in the inner space and an actuator end which is movable to rotate the first lever arm so that the rotor blade is retained between the blade support and the retaining end.

In another aspect, a lifting system for handling a rotor blade of a wind turbine is provided. The lifting system includes a lifting tool and a handling device. The handling device includes a frame defining an inner space for at least partially accommodating the rotor blade, a blade support mounted to the frame, and a first lever arm pivotably mounted to the frame. The first lever arm includes a clamping end arranged in the inner space and an actuator end which is connected to the lifting tool so that the rotor blade is clamped between the blade support and the clamping end when the lifting tool lifts the handling device.

In yet another aspect, a method for handling a rotor blade of a wind turbine is provided. The method includes moving a handling device at least partially over the rotor blade from a leading edge side of the rotor blade while the rotor blade is held in a transport rack so that the rotor blade is supported by a blade support arranged in an inner space defined by a frame of the handling device. A retaining member, which is movably mounted to the frame, is moved onto a surface of the rotor blade so that the rotor blade is retained within the inner space between the retaining member and the blade support.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a handling device and a lifting system including the handling device that allows for an efficient gripping, lifting and/or orientation of wind turbine rotor blades, in particular of rotor blades which are provided as a stack, for example on a transport ship.

As used herein, the term "blade" is intended to be representative of any device that provides a reactive force when in motion relative to a surrounding fluid. As used herein, the term "wind turbine" is intended to be representative of any device that converts rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "flexible coupling member" is intended to be representative of a line, a rope, a cable or a chain.

Figure 1:
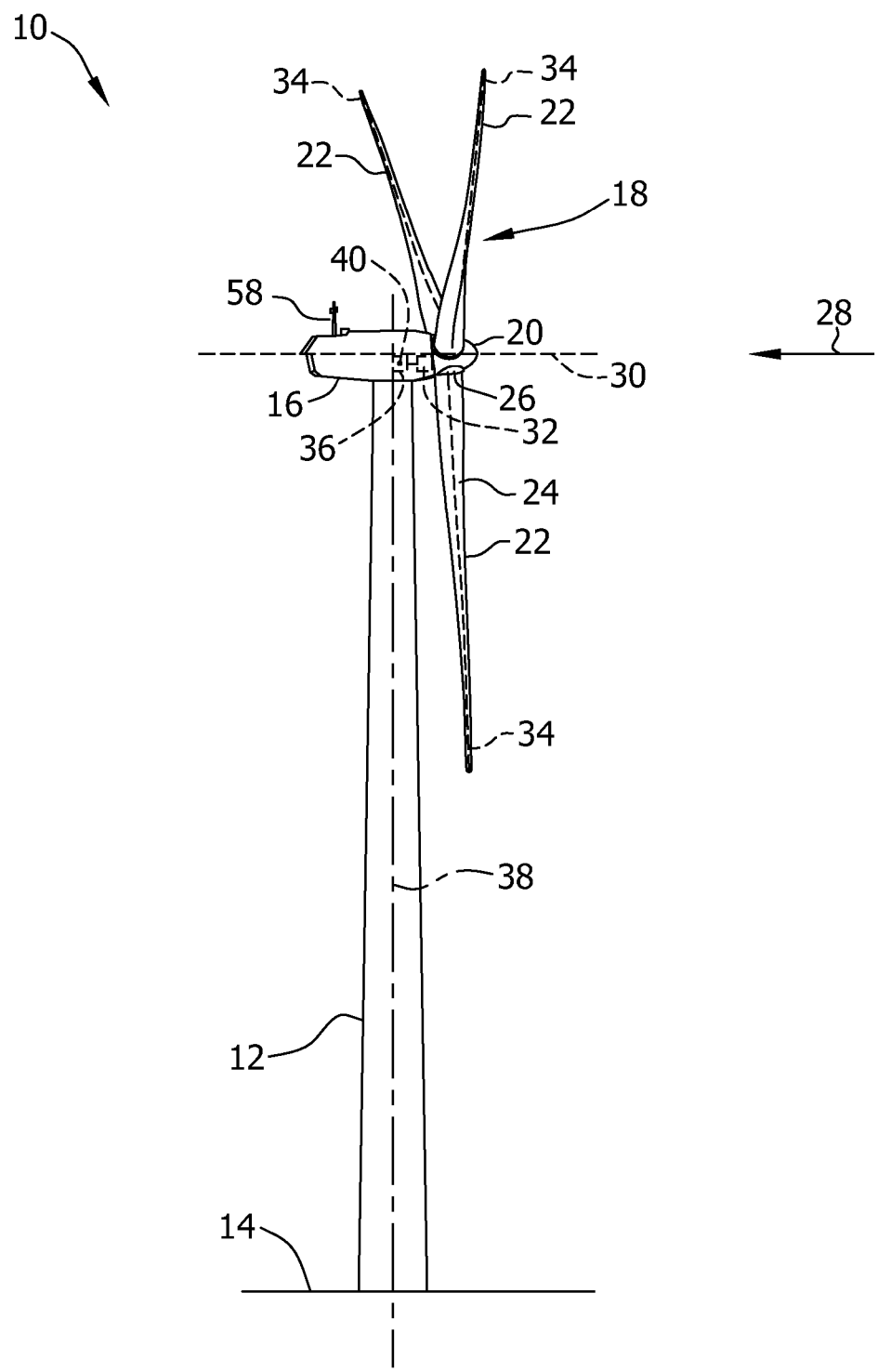
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Support system 14 may be arranged on or provided by a basement of an on-shore wind turbine 10. In an alternative embodiment, wind turbine 10 is off-shore wind turbine. In this embodiment, support system 14 is typically arranged on and/or provided by a floating platform anchored to an underwater ground or by a jacket foundation.

Nacelle 16 also includes at least one meteorological mast 58 that includes a wind vane and anemometer (neither shown in FIG. 1). Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 90 m. Alternatively, rotor blades 22 may have any suitable length that enables wind turbine 10 to function as described herein. For example, other non-limiting examples of blade lengths include 10 m or less, 20 m, 37 m, or a length that is greater than 90 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
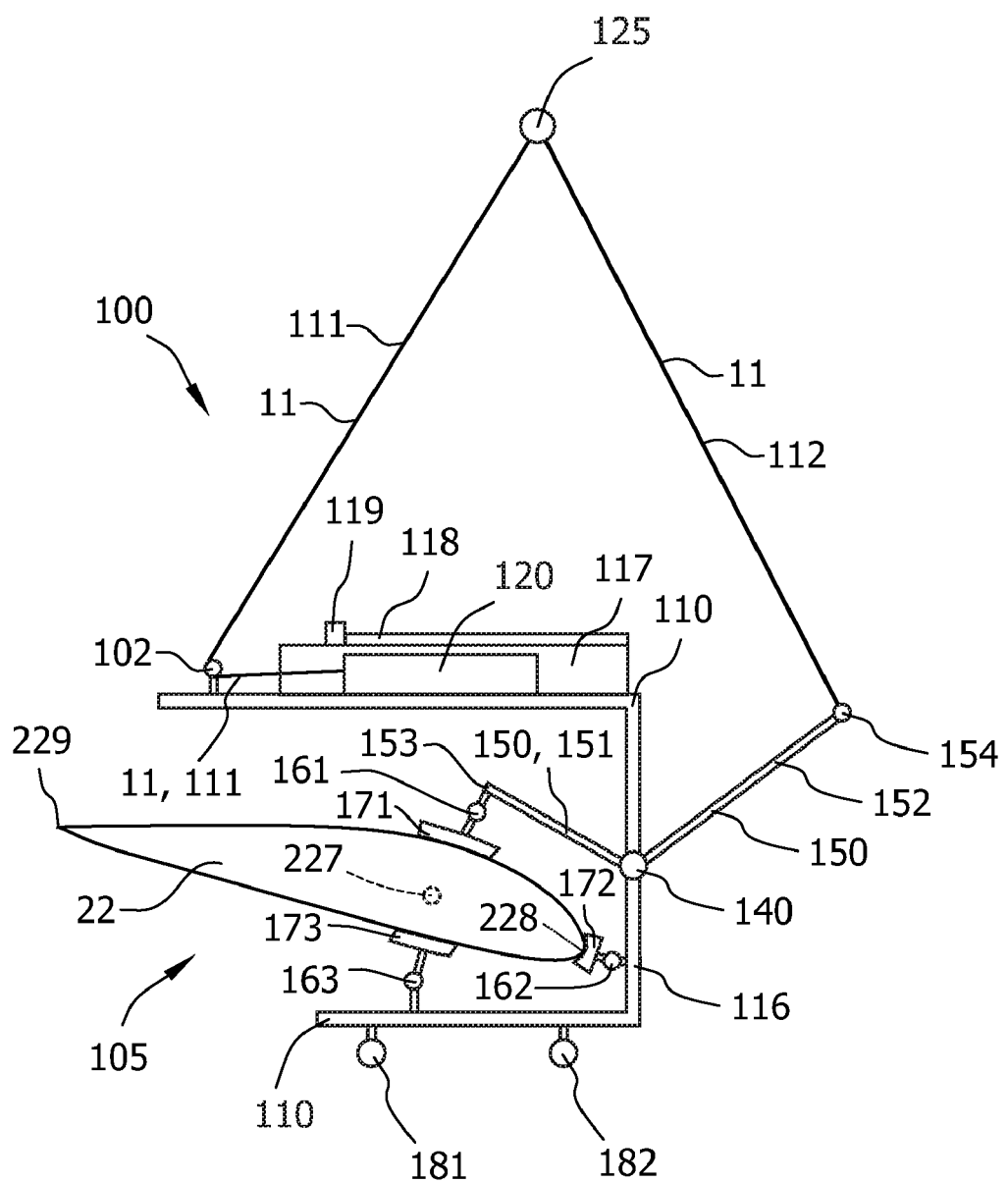
FIG. 2 illustrates a device for handling a wind turbine rotor blade according to an embodiment.

FIG. 2 shows a cross-sectional view of a device 100 for handling a rotor blade 22 of a wind turbine according to an embodiment. Device 100 has a frame 110 with an inner space 105 for at least partially accommodating rotor blade 22. In the exemplary embodiment illustrated in FIG. 2, a trailing edge 229 of rotor blade 22 is arranged outside the inner space 105.

Typically, frame 110 extends in a direction which is perpendicular to the shown vertical cross-section so that a portion of rotor blade 22 is arranged in the inner space 105 with a span line 227 of rotor blade 22 being substantially perpendicular to the cross-section of FIG. 2. Frame 110 may, for example, form a yoke that can be arranged, typically partly arranged, around rotor blade 22.

In the exemplary embodiment illustrated in FIG. 2, the frame 110 is, in the shown vertical cross-section, c-shaped and opened on the left side. Accordingly, frame 110 may be arranged around rotor blade 22 when rotor blade 22 is supported by a transport bracket or securing device, for example held in a transport rack on a ship (not shown in FIG. 2). Typically, device 100 is at least partially moved over the held rotor blade 22 from a leading edge side of rotor blade 22 so that rotor blade 22 is supported within the inner space 105.

In the exemplary embodiment illustrated in FIG. 2, two pads 172, 173 are arranged in inner space 105. The two pads 172, 173 form at least a part of the blade support. Typically, the pads 172, 173 are mounted to frame 110 via respective joints 162, 163. Accordingly, adaptation of the support system to different rotor blades may be facilitated. Even further, frame 110 may have an array of anchorage points for the pads 172, 173. This also facilitates the adaptation of the support system to different rotor blades.

According to an embodiment, a first lever arm 150 is pivotably mounted to a middle portion 116 of the c-shaped frame 110. A first portion 151 of the first lever arm 150 is arranged in inner space 105 and a second portion 152 of lever arm 150 is arranged outside frame 110. A joint 40 mounted to the middle portion 116 of the c-shaped frame 110 allows rotational movement of the first lever arm 150 in the shown vertical cross-section.

In the exemplary embodiment illustrated in FIG. 2, the first lever arm 150 is substantially L-shaped. An angle between the first portion 151 and the second portion 152 may, for example, be in a range from about 40° to about 160°, more typically in a range from about 70° to about 120°. The first lever arm 150 has a retaining end 153 arranged in the inner space 105 and an actuator end 154 which is typically arranged outside frame 110. A pad 171 is mounted to the retaining end 153, typically via a joint 161. Rotor blade 22 supported by the blade support 172, 173 may be temporarily retained between the blade support 172, 173 and the pad 171 forming a retaining member. This may be achieved by rotating the first lever arm 150 so that a distance between the pad 171 and 173 is reduced until pad 171 is moved onto an outer surface of rotor blade 22. Instead of using pad 171 as a retaining member, one or several pins mounted to the first lever arm 150 or a suitably shaped plate mounted to the first lever arm 150 may be used to retain rotor blade 22 within the inner space 105 of frame 110. Typically, rotor blade 22 is temporarily clamped between the blade support 172, 173 and the retaining end 153 and pad 171, respectively, by rotating the first lever arm 150. Therefore, retaining end 153 is in the following also referred to as clamping end.

Typically, the pads 171, 172, 173 have appropriate formed surfaces so that rotor blade 22 may be safely supported and clamped, respectively. For example, the pads 171, 172, 173 may have outer surfaces that substantially smoothly follow respective portions of the rotor blades airfoil. For example, pad 172 is typically formed in accordance with a shape of a leading edge portion 228 of rotor blade 22. As illustrated in FIG. 2, pad 173 may be formed to fit to a portion of a pressure side of rotor blade 22 and pad 171 may be formed to fit to a portion of a suction side of rotor blade 22. Alternatively or in addition, the outer surfaces of the pads 171, 172, 173 may include friction enhanced surfaces. For example, the outer surfaces of the pads 171, 172, 173 may be formed by respective vulcanized rubber layers with a treat pattern. Accordingly, the grip between rotor blade 22 and the pads 171, 172, 173 may be improved.

FIG. 2 typically corresponds to a situation in which rotor blade 22 is clamped between the clamping end 153 and the blade support 172, 173, for example during lifting rotor blade 22 with a lifting tool, for example a crane (not shown in FIG. 2). A first flexible coupling member 111 and a second flexible coupling member 112 are held taut by the lifting tool connected to a holding unit 125. The holding unit 125 may form a part of the device 100 or a part of the lifting tool.

According to an embodiment, the second flexible coupling member 112 has a fixed length and connects the holding unit 125 and the actuator end 154. As the lifting tool and the actuator end 154 are connected via a flexible coupling member 112 of a fixed length, the first level arm 150 exerts via the pad 171 a force on rotor blade 22 when the lifting tool lifts the holding unit 125. When the lifting tool lifts the holding unit 125 further, rotor blade 22 is retained in the lifted device 100. In the following, device 100 is also referred to as handling device and as blade gripper, respectively.

For loading or releasing rotor blade 22, holding unit 125 is lowered relative to frame 110. Accordingly, the first and second flexible coupling members 111, 112 are relaxed and the first level arm 150 is in a clock-wise rotated position in which pad 171 is lifted. Likewise, the first level arm 150 may be anti clock-wise rotated by lifting the holding unit 125 to clamp rotor blade 22 after arranging rotor blade 22 on the blade support formed by the pads 172, 173.

According to an embodiment, a first actuator 120 is arranged on frame 110 and connected with holding unit 125 by the first flexible coupling member 111 which may be redirected by a roller 102 mounted to frame 110. The first actuator 120 may be a hydraulically or electromechanically driven linear or rotating actuator. The first actuator 120 is configured to change a length of the first flexible coupling member 111. As explained below in detail, blade gripper 100 may be turned by changing a length of the first flexible coupling member 111 during lifting.

Due to using a rotatably movable lever arm 150 which is connected to a lifting tool, rotor blade 22 is clamped during lifting by a clamping force which is, at given geometry, determined by the mass of the rotor blade, the mass of the blade gripper and an aerodynamic load that may be exerted on rotor blade 22 by the wind. Accordingly, the gripping force exerted on rotor blade 22 is self-adapted to aerodynamic loads acting on blade 22. In doing so, only comparatively low gripping force are applied during lifting which still allows safe lifting of rotor blade 22.

Instead of using two flexible coupling members 111, 112, one flexible coupling member 11 may be used to connect the first actuator 120 with the holding unit 125 and the holding unit 125 with the actuator end 154. In this embodiment, the flexible coupling members 11 is fixed at holding unit 125 so that the flexible coupling members 11 is divided in a first portion 111 and a second portion 112. The first portion 111 connects the holding unit 125 and the first actuator 120 which is adapted to change a length of the first portion 111. The second portion 112 is of constant length and connects holding unit 125 and actuator end 154 of the first lever arm 150.

According to an embodiment, several wheels 181, 182 are mounted to and below frame 110. Accordingly, blade grabber 100 may, for removal of rotor blade 22 out of a transport rack used for transporting rotor blade 22 to the erection side of the wind turbine, easily be moved into the transport rack.

According to a further embodiment, rails 118 are arranged on frame 110, for example above the first actuator 120 using an appropriate housing 117. Typically, the wheels 181, 182 and the rails 118 are arranged such that several blade grabbers 100 may be arranged over each other with the wheels of one blade gripper sitting on respective rails of the other blade gripper. Accordingly, several blade grippers may be moved together into the transport rack. This may be facilitated by additional wheel stops 119 on and/or at the rails 118.

Figure 3:
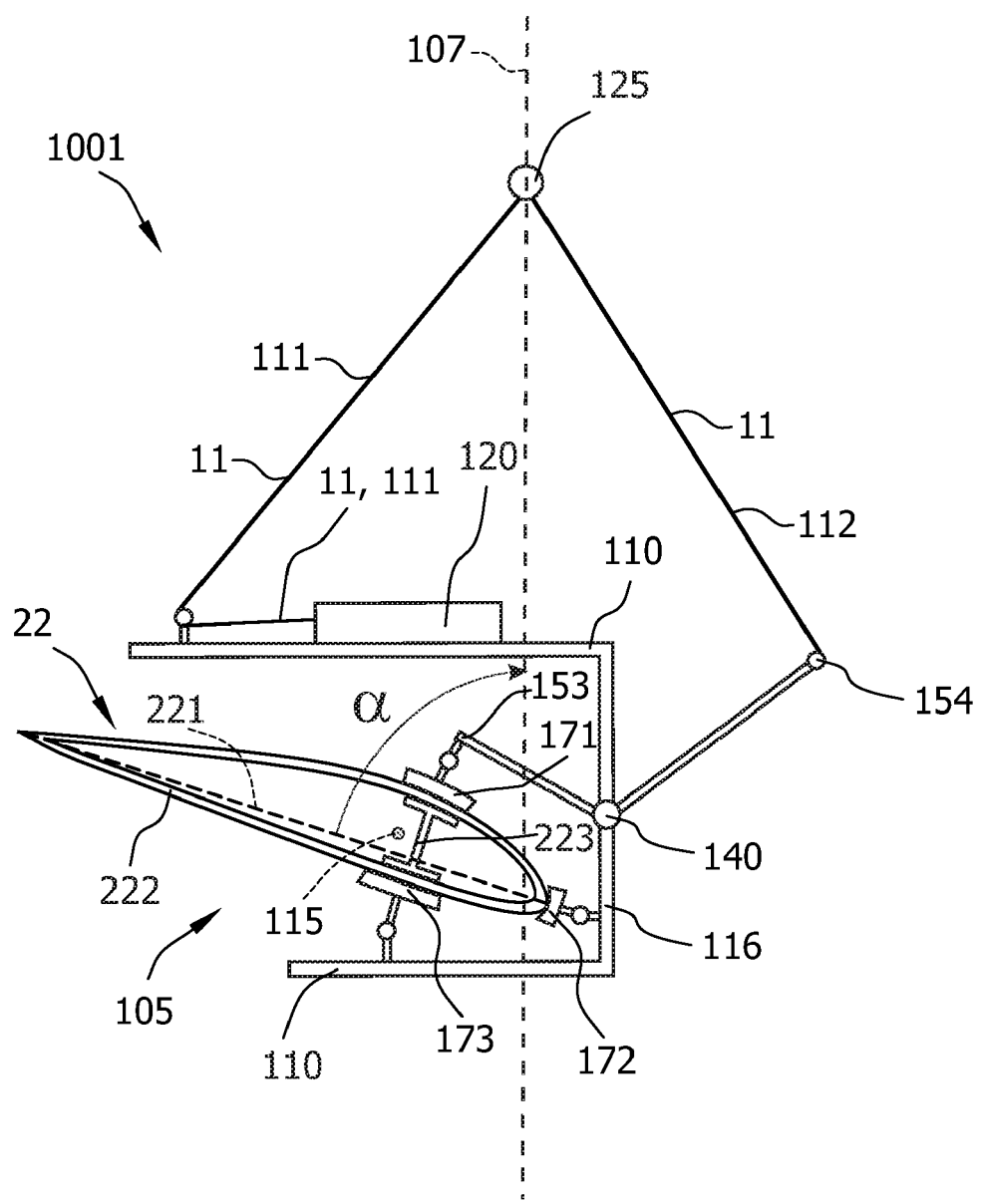
FIG. 3 illustrates a device for handling a wind turbine rotor blade according to another embodiment.

FIG. 3 shows, in a cross-sectional view, an embodiment of a blade gripper 1001 for handling rotor blade 22 of a wind turbine. Blade gripper 1001 is similar to blade gripper 100 illustrated in FIG. 2. For sake of clarity, optional wheels and rails of blade gripper 1001 are, however, not illustrated in FIG. 3. FIG. 3 illustrates blade gripper 1001 in a lifted position. A center of mass 115 of blade gripper 1001 including rotor blade 22 is typically arranged in the inner space 105.

According to an embodiment, blade gripper 1001 includes, in a further vertical cross-section which is parallel to the shown cross-section of FIG. 3, a second actuator (not shown in FIG. 3) mounted to frame 110 and a second lever arm (not shown in FIG. 3) pivotably mounted to frame 110. The further vertical cross-section is typically similar to the cross-section of FIG. 3. The second lever arm also typically includes a clamping end arranged in the inner space 105 and an actuator end connected to holding unit 125. The actuator end and the holding unit 125 may be connected with a third flexible coupling member (not shown in FIG. 3) which also connects the holding unit 125 and the second actuator 220. Typically, the second actuator is adapted to change a length of the third flexible coupling member. In this embodiment, the center of mass 115 is typically arranged between the vertical cross-section of FIG. 3 and the further vertical cross-section. Using to lever arms may facilitate clamping of rotor blade 22. Further, orientation of rotor blade 22 may be improved by using a first and a second actuator connected with the holding unit 125.

During lifting blade gripper 1001 with blade 22, the middle portion 116 of the c-shaped frame 110 is typically orientated substantially vertical as shown in FIG. 3. Furthermore, an angle α between a cord line 221 of rotor blade 22 and a vertical axis 107 through frame 110 is typically substantially equal or lower than 90°. Accordingly, rotor blade 22 can safely be lifted with blade gripper 1001.

According to an embodiment, pad 173 of the support system and pad 171 mounted to clamping end 154 of first lever arm 150 adjoin an outer surface of a shell 222 of rotor blade 22 such that the clamping force between the pads 171 and 173 is substantially transferred by a spar cap 223 of rotor blade 22. Accordingly, high enough clamping forces may be applied to rotor blade 22 without risking blade damage.

Figure 4:
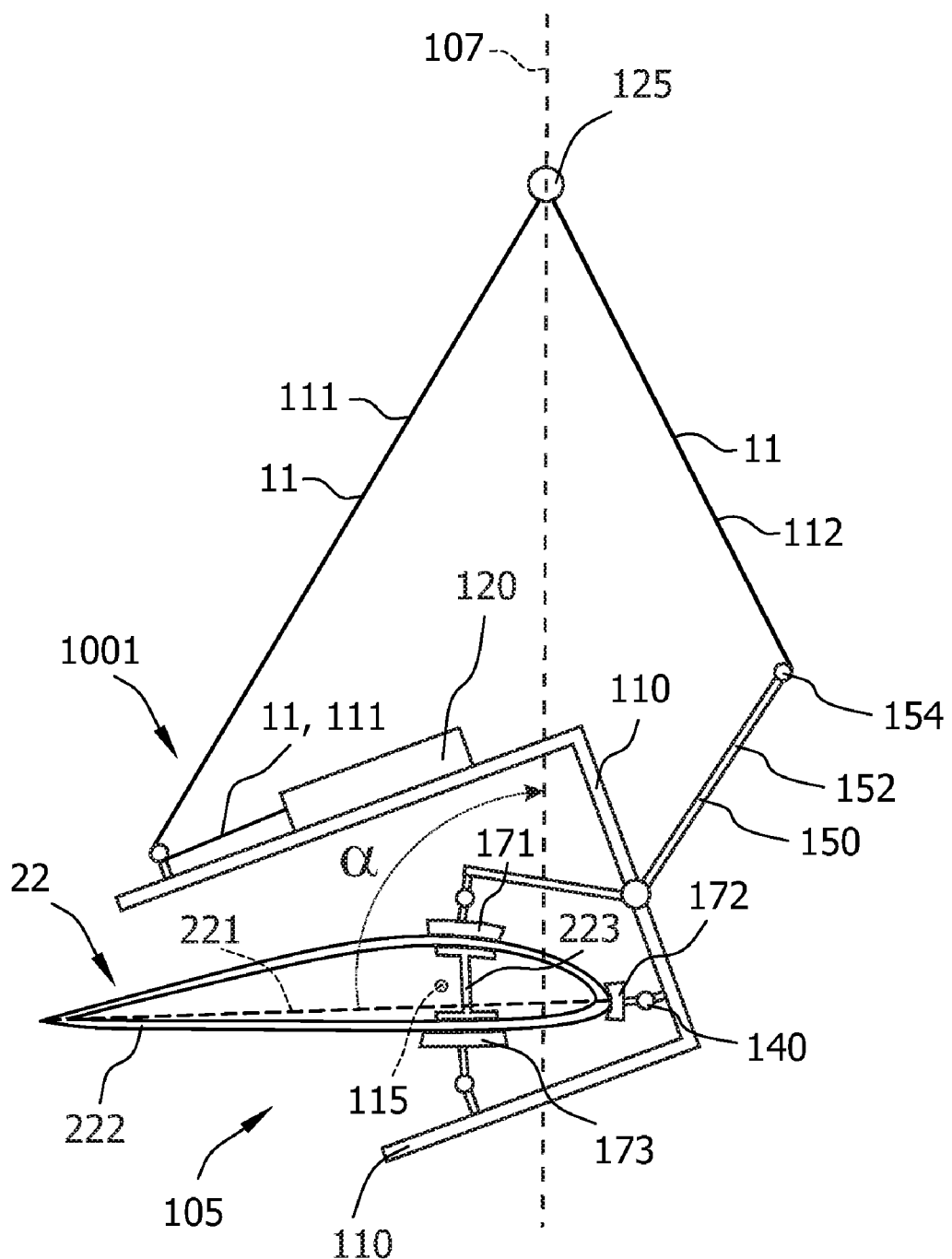
FIG. 4 illustrates a device for handling a wind turbine rotor blade according to still another embodiment.

FIG. 4 shows a cross-sectional view of blade gripper 1001 including rotor blade 22 according to an embodiment. Compared to FIG. 3, the length of the first flexible coupling member 111 is increased by the first actuator 120 in the embodiment illustrated in FIG. 4. Accordingly, the angle α between cord line 221 and vertical axis 107 is increased and the center of mass 115 is lowered relative to holding unit 125. This may be used to orientate rotor blade 22 when lifted to the hub of the wind turbine prior to mounting rotor blade 22 to the hub.

Figure 5:
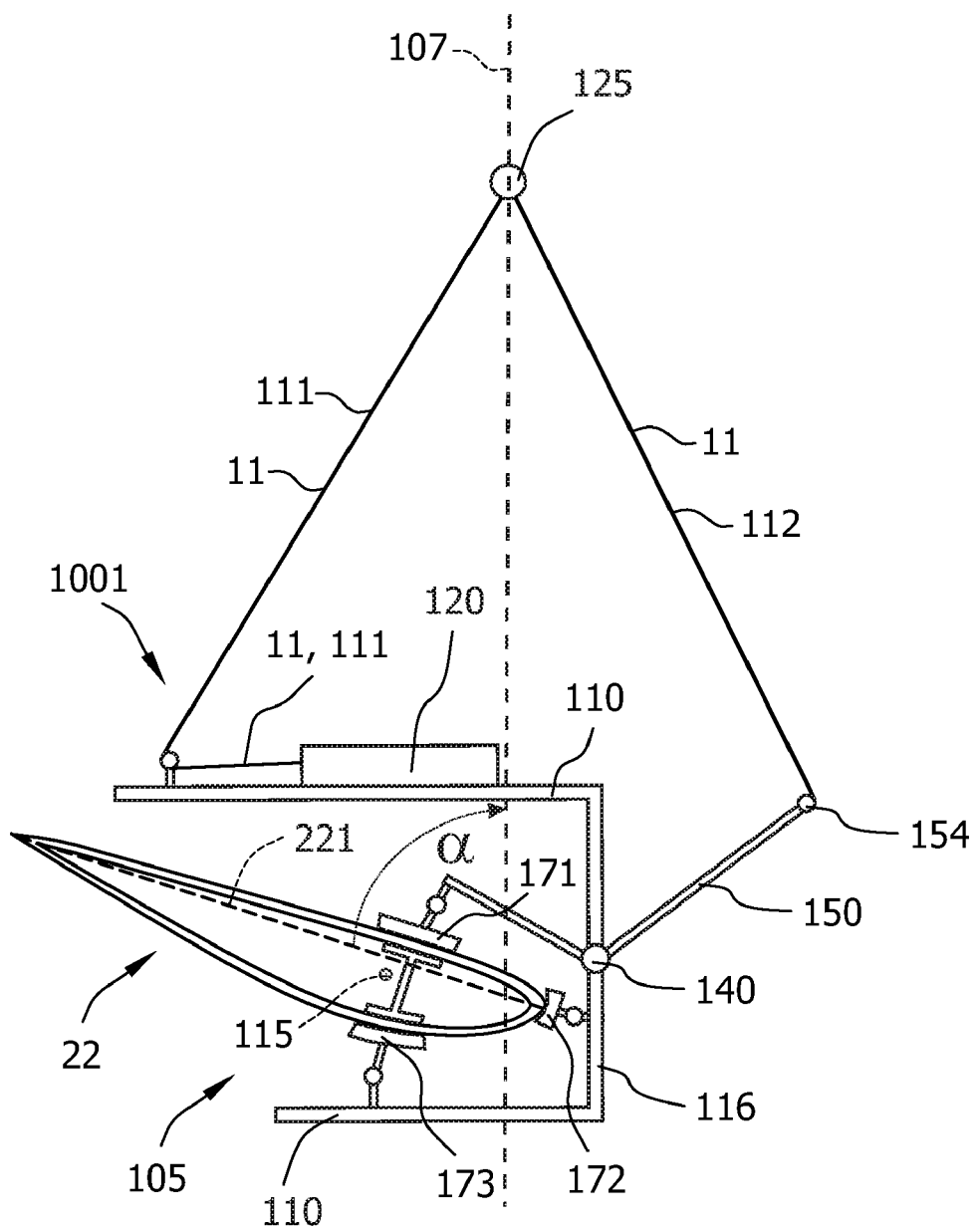
FIG. 5 illustrates a device for handling a wind turbine rotor blade according to yet another embodiment.

FIG. 5 shows a cross-sectional view of blade gripper 1001 including rotor blade 22 according to another embodiment. Rotor blade 22 is also clamped between pad 173 of the support system 172, 173 and pad 171 mounted to the clamping end 154 of the first lever arm 150, but in a different orientation. In the embodiments illustrated in FIGS. 4 and 5, pad 171 presses on a suction side of rotor blade 22 and a pressure side of rotor blade 22, respectively. Accordingly, rotor blade 22 may be lifted in both orientations with the same blade gripper 1001. This may, for example, be achieved by exchanging the typically differently shaped pads 171 and 173.

Figure 6:
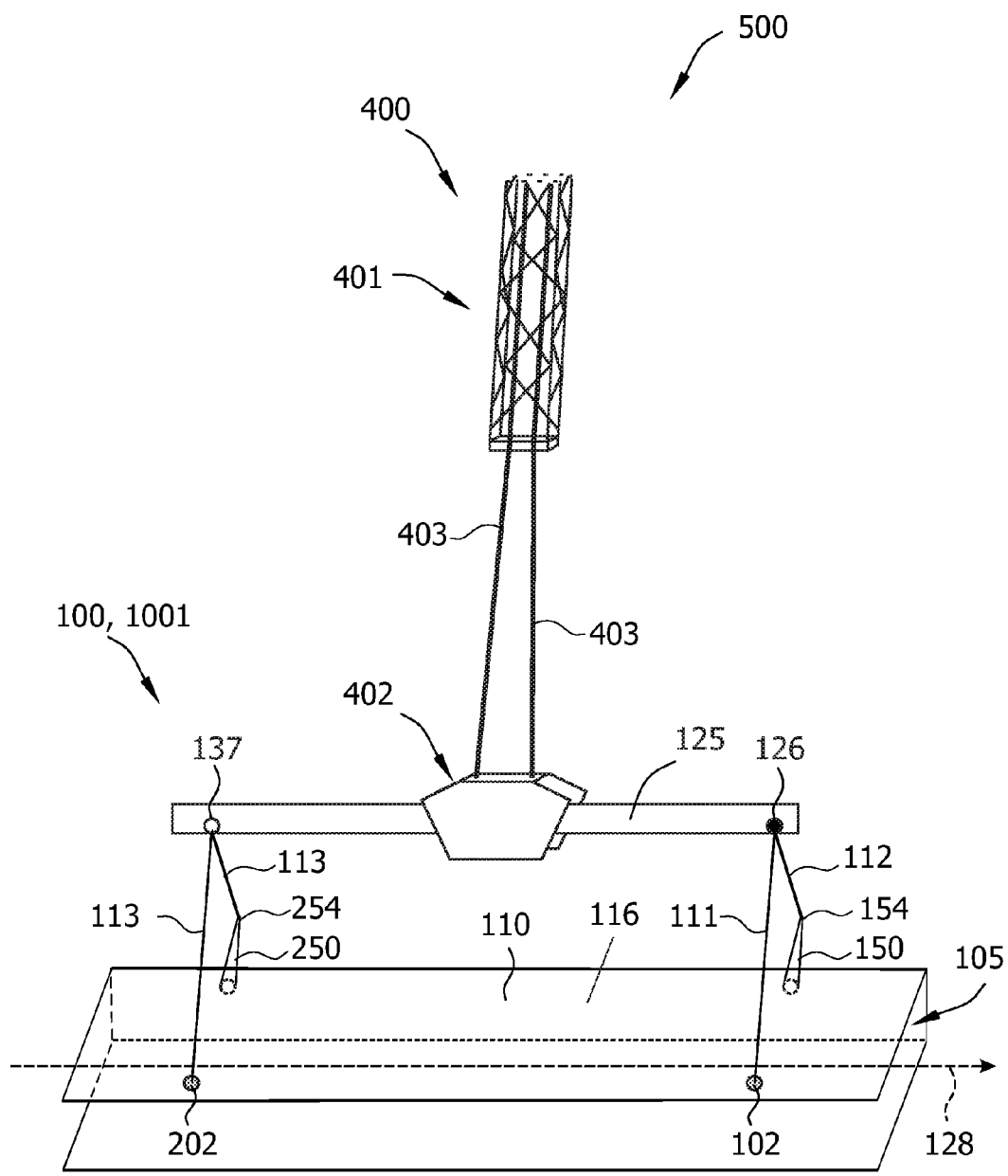
FIG. 6 illustrates a lifting system for handling a rotor blade of a wind turbine according to an embodiment.

FIG. 6 schematically shows an embodiment of a lifting system 500 for handling a rotor blade 22 of a wind turbine. Lifting system 500 includes a lifting tool 400, typically a crane. In the exemplary embodiment illustrated in FIG. 6, only a boom 401, crane cables 403 and hook block or gripper 402 of crane 400 are shown.

Lifting system 500 further includes a blade gripper 100, 1001 as explained with reference to FIGS. 2 to 5. For sake of clarity, blade gripper 100, 1001 is only illustrated schematically. Blade gripper 100, 1001 includes a frame 110 defining an inner space 105 for at least partially accommodating the rotor blade (not shown in FIG. 6). The rotor blade is typically supported by a blade support (not shown in FIG. 6) mounted to frame 110 so that the span line of the supported rotor blade is substantially parallel to an axis 128 which extends through the inner space 105 and is substantially parallel to the middle portion 116 of the c-shaped frame 110. For example, the span line of the supported rotor blade may substantially correspond to axis 128. Middle portion 116 typically forms a rear wall or backside of frame 110 and is arranged between a bottom side and top side of frame 110. Typically, axis 128 and the span line of the supported rotor blade, respectively, are also substantially parallel to the bottom side and the top side.

According to an embodiment, a first lever arm 150 is pivotably mounted to frame 110. The first lever arm 150 includes a clamping end (not shown in FIG. 6) arranged in the inner space 105 and an actuator end 154 connected via a connection 112 of fixed length to a holding unit 125 connected to lifting tool 400 so that the rotor blade is clamped between the blade support and the clamping end when the lifting tool 400 lifts the blade gripper 100, 1001. Connection 112 between the actuator end 154 and a suspension point 126 of holding unit 125 may be formed by a second portion of a first flexible coupling member or by a second flexible coupling member. A first actuator 120 (not shown in FIG. 6) is typically mounted to frame 110, for example on the top side, and connected with suspension point 126 via a connection 111. Connection 111 is typically deflected by a roller 202. Connection 111 may be formed by a first portion of the first flexible coupling member in case connection 112 is formed by the second portion of the first flexible coupling member or by the first flexible coupling member. When the length of the connection 111 is changed using the first actuator, frame 110 is rotated about axis 128. Accordingly, the lifted rotor blade may be rotated about axis 128 and the span line, respectively, with the first actuator. In other words, the lifted rotor blade may be rotated with the first actuator in a plane which is substantially perpendicular to the span line of the rotor blade. Connections 111 and connection 112 are in the following also referred to as first connection and second connection, respectively.

According to an embodiment, a third connection 113, typically formed by a third flexible coupling member, connects a second actuator (not shown in FIG. 6) with holding unit 125 and a second lever arm 250 pivotably mounted to frame 110. Typically, the third connection 113 is deflected by a roller 202 mounted to frame 110. The second lever arm 250 typically also has a clamping end arranged in the inner space 105 and an actuator end which is connected with holding unit 125 by the third connection 113. In the exemplary embodiment illustrated in FIG. 6, third connection 113 can slight through holding unit 125 using a roller 137 or eyelet 137. Roller 137 is typically arranged opposite to suspension point 126. Further, the gripper 402 of crane 400 typically grips holding unit 125 between suspension point 126 and roller 137. This facilitates balancing of blade gripper 100, 1001 during lifting.

Prior to lifting, the rotor blade is arranged in the inner space 105 with relaxed connections 111, 112, 113. Thereafter, the rotor blade may be clamped, for example by lifting the holding unit 125 with crane 400, between the actuator ends of the first and second lever arms 150, 250 and a blade support typically formed by respective pads (not shown in FIG. 6) arranged in the inner space 105. Further lifting of holding unit 125 results in lifting of blade gripper 100, 1001 and the clamped rotor blade.

When the second actuator changes, during lifting, a length of the third connection 113 and the third flexible coupling member 113, respectively, axis 128 of blade gripper 100, 1001 changes its orientation in a vertical plane. In other words, the span line of the lifted rotor blade may be vertically rotated with the second actuator. Using a first actuator and a second actuator which are configured to independently change the length of the first coupling 111 and the third coupling 113, respectively, allows for the orientation of the blade gripper 100, 1001 and the clamped rotor blade in two independent rotational directions. For example, the length of the first connection 111 and the third connection 113 may be changed by the same amount to rotate blade gripper 100, 1001 and the clamped rotor blade only about axis 128. To rotate blade gripper 100, 1001 with the clamped rotor blade only in a vertical plane, only the length of the third connection 113 is changed by the second actuator while the length of the first connection 111 remains unchanged. Orientating the blade gripper 100, 1001 and the clamped rotor blade in two independent rotational directions using the first actuator and the second actuator of blade gripper 100, 1001 facilitates alignment of a root section of the rotor blade to the hub. Thus assembling time of rotor blades to the hub may be reduced.

In another embodiment, the third flexible coupling member 113 is fixed at the position of the roller 137. Accordingly, only the length of a first portion of the third flexible coupling member 113 may be changed by the second actuator. This also allows orientating the blade gripper 100, 1001 and the clamped rotor blade in two independent rotational directions.

Figure 7:
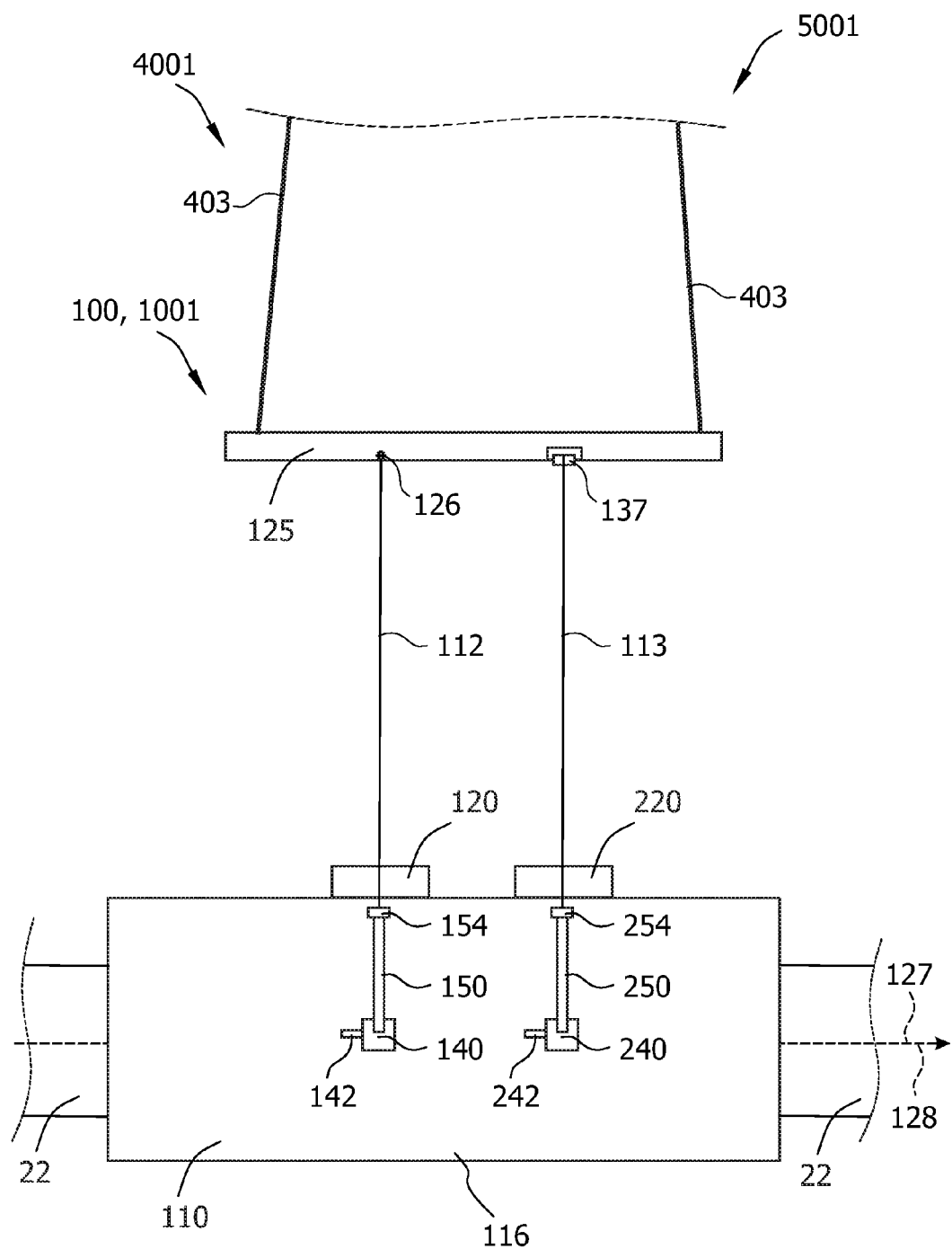
FIG. 7 illustrates a lifting system for handling a rotor blade of a wind turbine according to another embodiment.

FIG. 7 shows a side view of a lifting system 5001 for handling a rotor blade 22 of a wind turbine according to an embodiment. Lifting system 5001 is similar to lifting system 500 explained with reference to FIG. 6. However, the holding unit 125 is directly connected to cables 403 of a lifting tool 4001 and may, therefore, also form a part of the lifting tool 4001, for example a crane. Apart from that, the drawing of FIG. 7 typically also corresponds to the lifting tool 500 illustrated in FIG. 6 when viewed from the side of the middle portion 116 of frame 110. In addition, a clamped rotor blade 22 is shown. Typically, the extension of frame 110 in direction of the span line 127 of the clamped rotor blade 22 is smaller than the extension of rotor blade 22 in this direction.

In the exemplary embodiment illustrated in FIG. 7, the first actuator 120 and the second actuator 220 are mounted on frame 110. The first actuator 120 is connected with holding unit 125 via a first connection (not shown in FIG. 7). The holding unit 125 is connected with an actuator end 154 of a first lever arm 150. Further, the holding unit 125 is connected with an actuator end 254 of a second lever arm 150 and with the second actuator 250 by a third connection 113.

Clamping and lifting of rotor blade 22 may be achieved by lifting the holding unit 125 similar as explained with reference to FIG. 6. However, after clamping rotor blade 22 a further process of locking the rotor blade 22 may be performed. For example, locking pins 142, 242 may be introduced into respective joints 140, 240 to prevent any rotation of the first and second lever arms 150, 250 during lifting.

Figure 8:
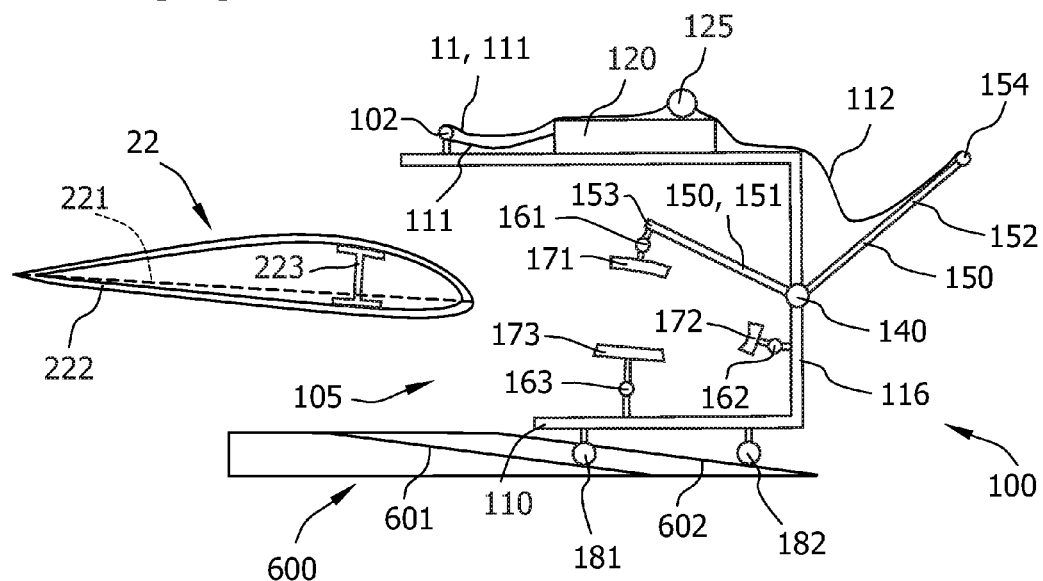
FIGS. 8 and 9 illustrate a device and a method for handling a rotor blade of a wind turbine according to embodiments.
Figure 9:
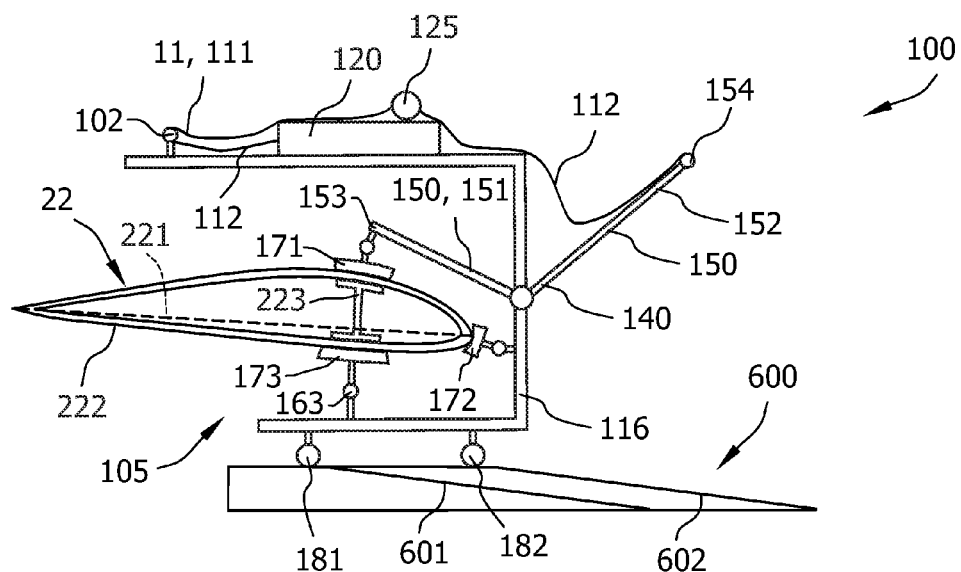

FIGS. 8 and 9 illustrate, in cross-sectional views, blade gripper 100 and a method for handling wind turbine rotor blade 22 according to embodiments. Rotor blade 22 illustrated in FIG. 8 is held in a transport rack (not shown in FIG. 8), for example on a ship. Typically, the extension of blade gripper 100 is chosen such that it may be moved, while the flexible coupling members 111, 112 are relaxed, to and at least partially around rotor blade 22 held in the transport rack without hitting it. For removing rotor blade 22 from the transport rack, blade gripper 100 is typically moved from a first position illustrated in FIG. 8 to a second position illustrated in FIG. 9. In the second position, the blade support 172, 173 of blade gripper 100 are or can be applied to rotor blade 22 held in the transport rack. Blade gripper 100 may be manually moved or moved by small truck to the second position.

Typically, blade gripper 100 is partially moved over rotor blade 22 from a leading edge side of rotor blade 22 while rotor blade 22 is held in the transport rack so that rotor blade 22 is supported by pads 172, 173. Thereafter, a pad 171 is typically moved onto an upper surface of rotor blade 22 so that the rotor blade is retained within the inner space 105 between the pad 171 and the pad 173. This is typically achieved by rotating a lever arm 150 to which pad 171 is mounted. Thereafter, rotor blade 22 may be released from the transport rack.

According to an embodiment, a ramp 600 is provided to facilitate releasing rotor blade 22 from the transport rack. In doing so, a height difference between the first position and the second position may be overcome. Ramp 600 typically has different tracks 601, 602, for example different rails, for the wheels 181 and 182 of blade gripper 100. Accordingly, blade gripper 100 may be moved on a defined path from the first position aside rotor blade 22 to the second position in which rotor blade 22 adjoins the pads 172, 173 of the blade support 172, 173. Further, ramp 600 may have suitably shaped and/or inclined tracks 601, 602 so that blade gripper 100 may be moved over ramp 600 to rotor blades 22 held in the transport rack with the cord line tilted to ground, for example tilted by up to 15° or even more.

Typically, a slope and/or a curvature of the tracks 601, 602 are chosen such that blade gripper 100 is moved to the second position with an appropriate orientation, for example in a substantially horizontal position as shown in FIG. 9. Blade gripper 100 may, for example, have four wheels 181, 182 two of which are arranged closer to the middle portion 116 of blade gripper 110 than the other two. In the exemplary embodiment illustrated in FIGS. 8 and 9, a path gage of the wheels 182 which are closer arranged to the middle portion 116 is smaller than a path gage of the other two wheels 181. The tracks for wheel pair 181 may, for example, correspond to tracks for wheels pair 182 but shifted by a distance between the wheel pairs 181, 182.

Further, the pad 173 illustrated in FIG. 8 may be rotated about joint 163 to facilitate moving blade grabber 100 into the second position. After moving blade gripper to rotor blade 22 so that pad 172 adjoins rotor blade 22, pad 173 may be turned to the supporting position illustrated in FIG. 9.

Even further, the first lever arm 150 may be locked in a safety position to avoid accidently hitting rotor blade 22. When the blade gripper 100 has reached the second position, the first lever arm 150 may be unlocked and the holding unit 125 may be connected to a lifting tool, for example a crane. Thereafter, the lifting tool lifts holding unit 125 and actuator end 154, thereby rotating the first lever arm 150 rotated, until rotor blade 22 is clamped between the clamping end 153 and the blade support 172, 173. Now, rotor blade 22 may be released from the transport rack. Thereafter, the clamped rotor blade 22 may be lifted together with blade gripper 100 by the lifting tool. Prior to lifting rotor blade 22, the first lever arm 150 may be locked in a clamping position. As the lifting tool is not required to move blade gripper 100 to the second position, assembly time for the rotor blades may be decreased when at least two blade grippers 100 are used for handling two or more rotor blades 22 or rotor blade sections. For example, one of the two blade grippers 100 may be arranged in a respective second position of a second rotor blade 22 while a firstly clamped rotor blade 22 is lifted.

Figure 10:
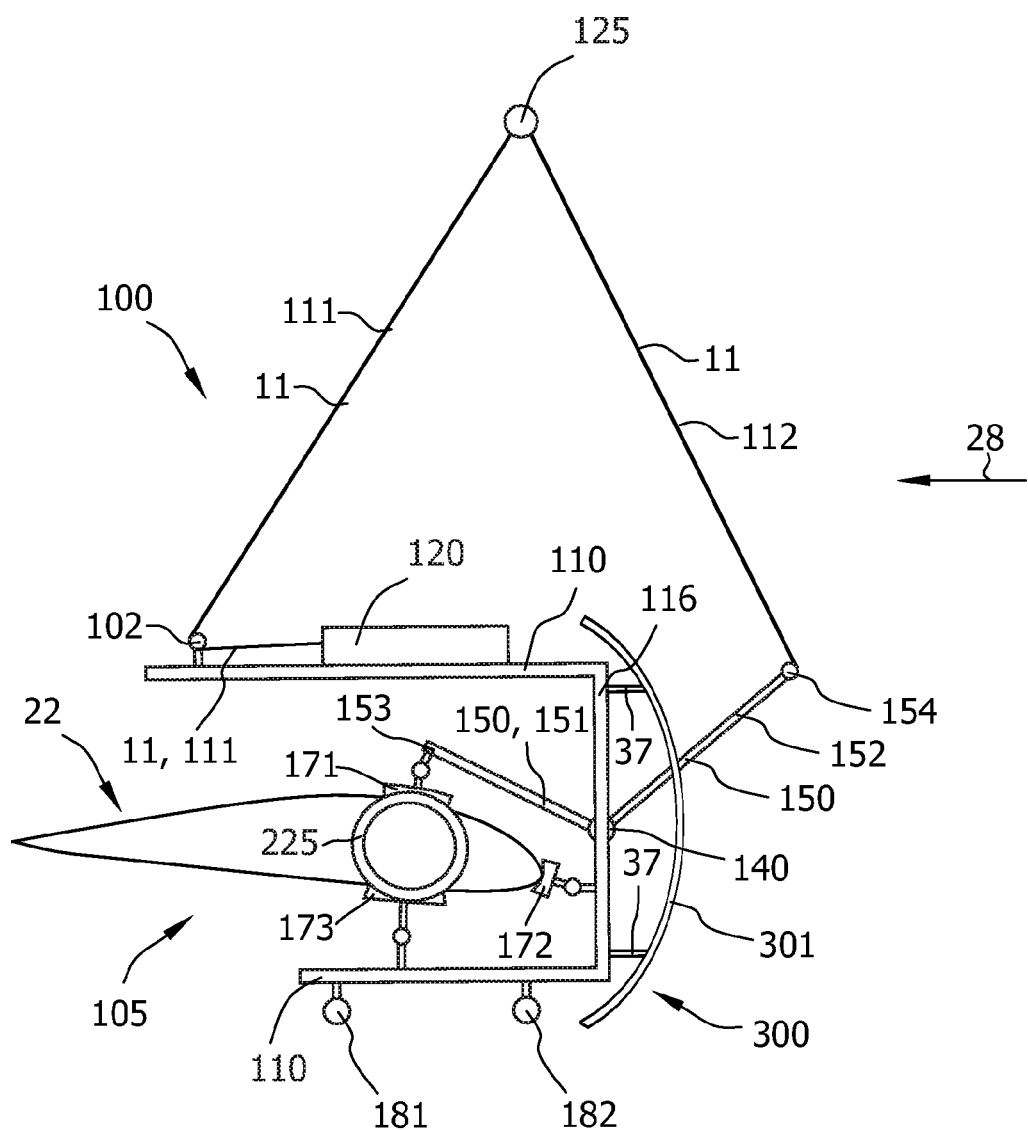
FIG. 10 illustrates a device for handling a rotor blade of a wind turbine according to an embodiment.

FIG. 10 schematically shows a side view of blade gripper 100 with rotor blade 22 according to an embodiment. The drawing of FIG. 10 corresponds to a view on a root section 225 of rotor blade 22. After clamping and prior to lifting rotor blade 22, a wind shield 300 may be mounted to frame 110. Typically, wind shield 300 is releasably mounted to the middle portion 116 of frame 110, for example by appropriate connectors 37. During lifting blade 22, the speed of wind 28 will typically change even if the wind condition does not change. The processes of lifting and orientating rotor blade 22 may last for up to several tens of minutes. In this time period, the external wind condition may change. Accordingly, blade gripper 100 and clamped rotor blade 22 may experience fluctuating aerodynamic forces during lifting rotor blade 22 and orientating rotor blade 22 relative to the hub of the wind turbine. Due to the shape of rotor blade 22, significant aerodynamic forces may be applied to rotor blade 22 during lifting and orientating rotor blade 22. The amplitude and/or the variation of these aerodynamic forces may significantly be reduced by using wind shield 300. In the shown vertical cross-section, wind shield 300 may have a parabolic profile or be shaped as a cylinder section. In other embodiments, the shape of wind shield 300 is chosen such that aerodynamic forces acting on not shielded portions of rotor blade 22 are at least partly compensated.

Figure 11:
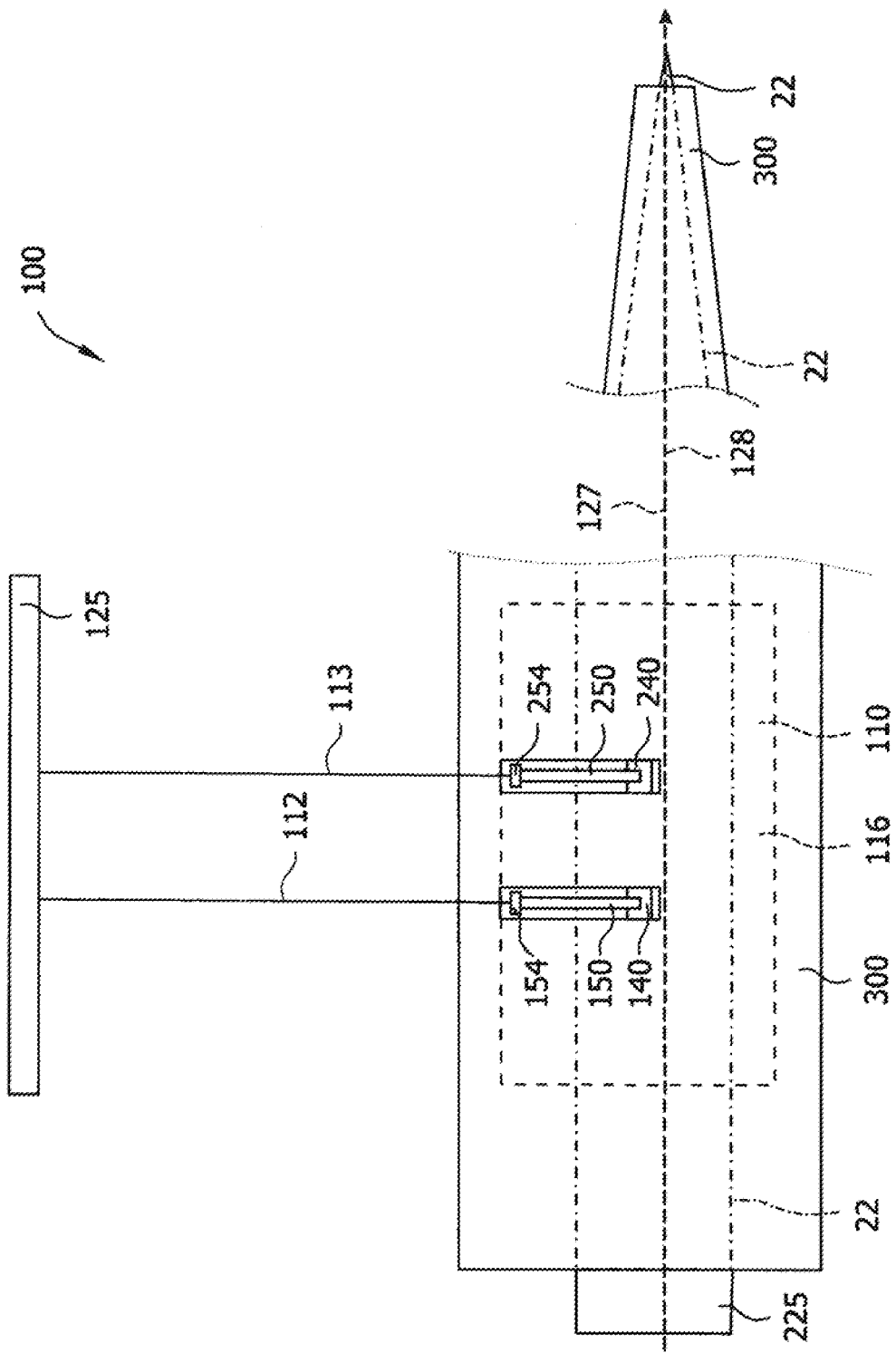
FIG. 11 illustrates a device for handling a rotor blade of a wind turbine according to yet another embodiment.

FIG. 11 illustrates the shielding of blade gripper 100 and rotor blade 22 according to an embodiment. The drawing of FIG. 11 may correspond to the drawing of FIG. 10 during lifting blade gripper 100 and rotor blade 22 when viewed from the wind side.

According to an embodiment, the extension of wind shield 300 exceeds an extension of frame 110, at least in direction of span line 127 of clamped rotor blade 22. Furthermore, wind shield 300 is typically mounted to frame 110 so that frame 110 is not visible when viewed from the side of middle portion 116 to which wind shield 300 is typically mounted to. Accordingly, at least frame 110 and the portion of wind blade 22 arranged inside frame 110 may be shielded against wind during lifting and orienting rotor blade 22. Typically, the first and second actuators are also not visible when viewed from the side of middle portion 116.

Typically, at least a root section 225 of rotor blade 22 remains unshielded to allow assembling the root section 225 to the hub of the wind turbine. Wind shield 300 may completely cover the remaining sections of rotor blade 22. In other embodiments at least a tip section of rotor blade 22 is not covered by wind shield 300.

Figure 12:
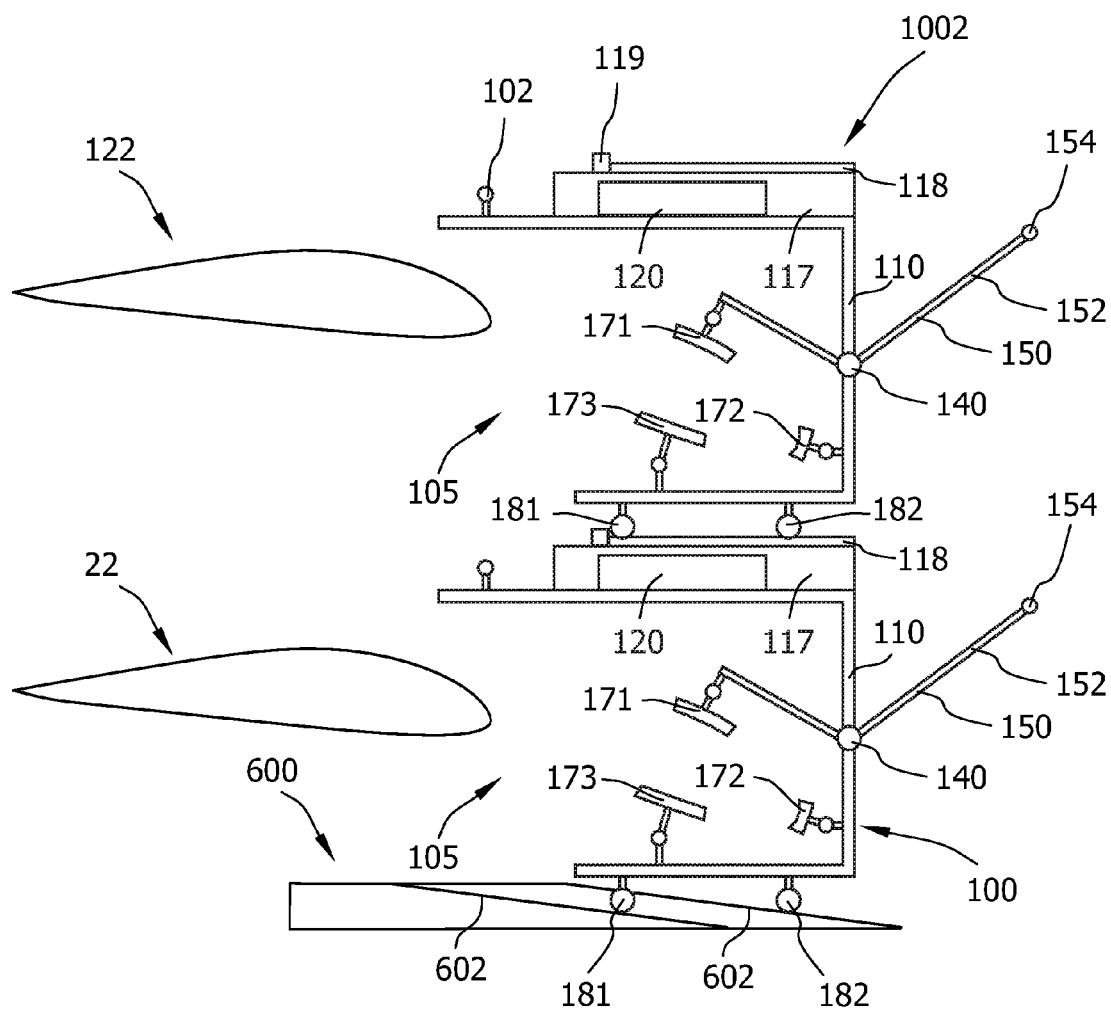
FIG. 12 illustrates devices and a method for handling rotor blades of a wind turbine according to embodiments.

FIG. 12 shows, in a vertical cross-section, embodiments of blade grippers 100, 1002 and illustrates a method for handling rotor blade 22, 122.

In the exemplary embodiment illustrated in FIG. 12, two blade grippers 100, 1002 are arranged over each other. The number of blade grippers 100, 1002 arranged over each other may depend on the number of blades to be mounted to the wind turbine and/or on the number of blades stacked over each other in a securing device used for transport, for example a transport rack on a ship. The wheels 181, 182 of blade gripper 1002 are arranged on corresponding rails 118 of blade gripper 100 and may be locked. Blade grippers 100, 1002 may be arranged over each other by a crane, typically by an additional smaller crane then a main crane used for lifting and orienting rotor blades 22, 122. In the exemplary embodiment, two rotor blades 22, 122 are held in a transport rack (not shown in FIG. 12) used for transport. Depending on orientation of rotor blades 22, 122 and height difference between the lower rotor blade 22 and ground or deck of a transport ship, a ramp 600 as explained with reference to FIGS. 8 and 9 may be used to facilitate moving the two blade grippers 100, 1002 together into a position in which the rotor blades 100, 1002 may be released from the transport rack. After moving blade grippers 100, 1002 together to this position, the upper blade 122 may be clamped in blade gripper 1002, released from the transport rack, and lifted using the main crane. After assembling rotor blade 122 to the wind turbine, the lower rotor blade 22 may be clamped in blade gripper 100, released from the transport rack and lifted using the main crane. Since the main crane need not to be used for arranging blade grippers 100, 1002 over each other and for moving the stacked blade grippers 100, 1002 to the stacked rotor blades 22, 122, assembly time of rotor blades 22, 122 may be reduced and thus costs saved compared to directly grabbing and lifting the stacked rotor blades 22, 122 using the main crane. Typically, about 15 minutes per rotor blade 22, 122 may be saved by preparing several rotor blades 100, 1002 with respective blade grippers 100, 1002 and by using the main crane only for clamping and lifting.

Figure 13:
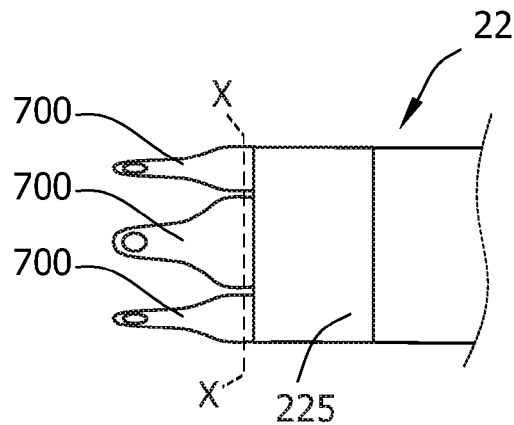
FIG. 13 illustrates an alignment aid mounted to a root section of a rotor blade of a wind turbine according to an embodiment.

FIG. 13 shows an embodiment of an alignment aid 700 for rotor blade 22 of a wind turbine. After lifting and orientating rotor blade 22 with the main crane and a blade gripper, rotor blade is to be mounted to the hub. Accuracy of blade orientation by means of the main crane, the blade gripper and optional holding ropes may be limited, in particular under fluctuating wind conditions. Furthermore, hitting of nacelle and/or rotor with bolts protruding out of the root section 22 of rotor blade 22 is typically to be avoided to protect the integrity of the rotor and/or the nacelle. Therefore, final alignment and/or approach of rotor blade 22 to the hub are often manually guided by a fitter inside the nacelle. For this purpose, the fitter often tries to grab rotor blade 22. This is, however, often tedious and may even be risky for the fitter.

According to an embodiment, at least one flexible alignment aid 700 is attached to the root section 225. The flexible alignment aid 700 typically extends further away from root section 22 than bolts attached to the root section 225. For example, the flexible alignment aid 700 may protrude 1 m or even more out of the root section 225. To facilitate handling from inside the nacelle, the flexible alignment aid 700 may be formed as a collar. Alternatively, several flexible alignment aids 700 may be arranged along a circumference of the root section.

Typically, the flexible alignment aid 700 is made of a rubber material or a composite material. Accordingly, the risk of damaging the nacelle and/or rotor during rotor blade assembly is reduced.

Once the root section has reached or closely approached the mounting position, the flexible alignment aid 700 can be removed.

Figure 14:
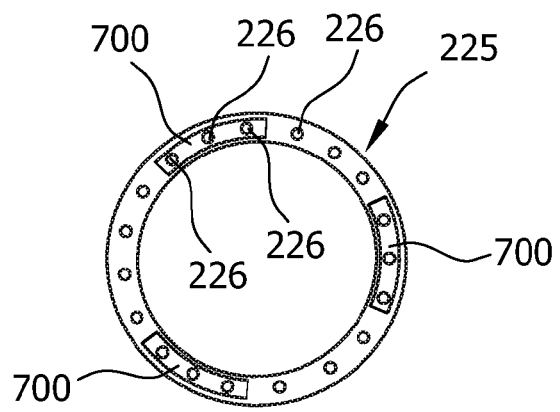
FIG. 14 illustrates an alignment aid mounted to a root section of a rotor blade of a wind turbine according to another embodiment.

FIG. 14 shows, in a cross-section along line X of FIG. 13, alignment aids 700 which are detachably mounted to the root section 225 of the rotor blade. In the exemplary embodiment illustrated in FIG. 14, three flexible alignment aids 700 are detachably mounted to the root section 255 by attaching them to bolts 226 of root section 225. For example, the flexible alignment aids 700 may be put on respective bolts.

Figure 15:
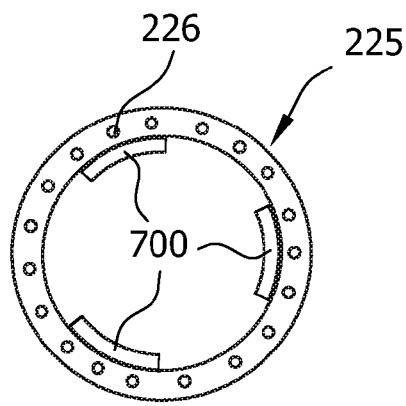
FIG. 15 illustrates an alignment aid mounted to a root section of a rotor blade of a wind turbine according to yet another embodiment.

FIG. 15 shows, in a cross-section along line X of FIG. 13, alignment aids 700 which are detachably mounted to the root section 225 of the rotor blade. In the exemplary embodiment illustrated in FIG. 15, three flexible alignment aids 700 are mounted to the root section by detachably attaching them to an inner surface of root section 225. For example, the flexible alignment aids 700 may be clamped to root section 225 using suitable clamping devices attached to the inner surface.

Figure 16:
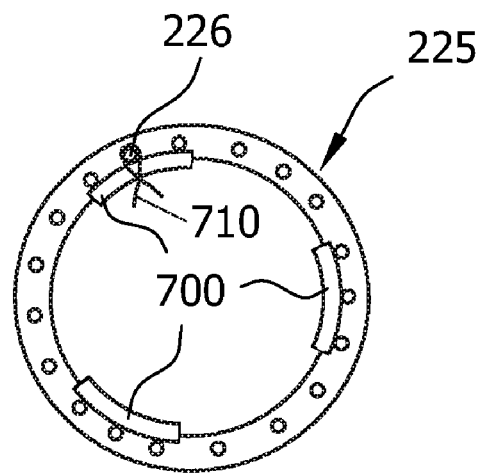
FIG. 16 illustrates an alignment aid mounted to a root section of a rotor blade of a wind turbine according to still another embodiment.

FIG. 16 shows, in a cross-section along line X of FIG. 13, alignment aids 700 which are detachably mounted to the root section 225 of the rotor blade. In the exemplary embodiment illustrated in FIG. 14, three flexible alignment aids 700 are detachably mounted to the root section by attaching them to bolts 226 of root section 225 with detachable connectors 710. For sake of clarity, only one detachable connector 710 is shown in the drawing of FIG. 16. The detachable connectors 710 may, for example, be clamps, threads or wires. For final aligning and/or approaching of root section 225 and rotor blade, respectively, one or more fitters may grab one or more alignment aids 700 and guide the root section 225 so that the bolts 226 are inserted in respective holes of the hub. Thereafter, the detachable connectors 710 may be removed and the root section fastened by screwing nuts to the bolts 226.

Figure 17:
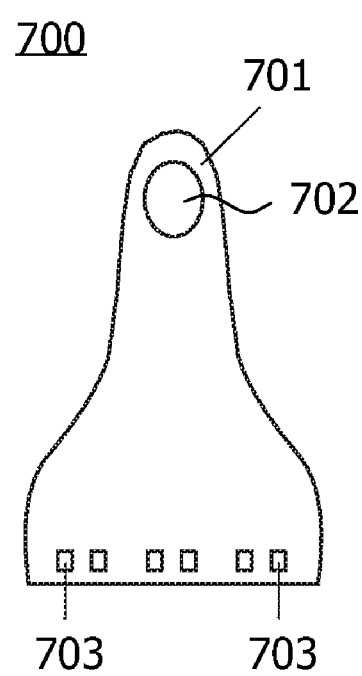
FIG. 17 illustrates an alignment aid for rotor blade of a wind turbine according to an embodiment.

FIG. 17 schematically shows, in a plane view, an embodiment of an alignment aid 700 which is detachably mountable to a root section of a rotor blade of a wind turbine. Typically, the flexible alignment aid 700 has a shell-shaped flexible body. The rigidity of the shell-shaped flexible body is typically chosen such that a self-loaded deformation of alignment aid 700 is substantially avoided.

According to an embodiment, a hand aperture 702 is arranged in a tip portion 701 of alignment aid 700. Typically, the tip portion 701 is suitably tapered. Accordingly, a handy tip portion 701 is formed which may be used as a handle during final aligning and/or approaching the rotor blade to the hub.

According to an embodiment, recesses 703 are provided in a portion which is opposite to the tip portion 701. The recesses 703 may be used to detachably fasten the flexible alignment aid 700 to an inner surface of the root section, as explained with reference to FIG. 15, or to detachably fasten the flexible alignment aid 700 to bolts of the root section, as explained with reference to FIG. 16. Using the flexible alignment aid 700 facilitates grabbing of the rotor blade from inside the nacelle and thus typically results in reduced assembly time per rotor blade. Furthermore, the safety of fitters is typically improved. Even further, the risk of damaging other parts of the rotor or the nacelle during blade assembly may be reduced.

Figure 18:
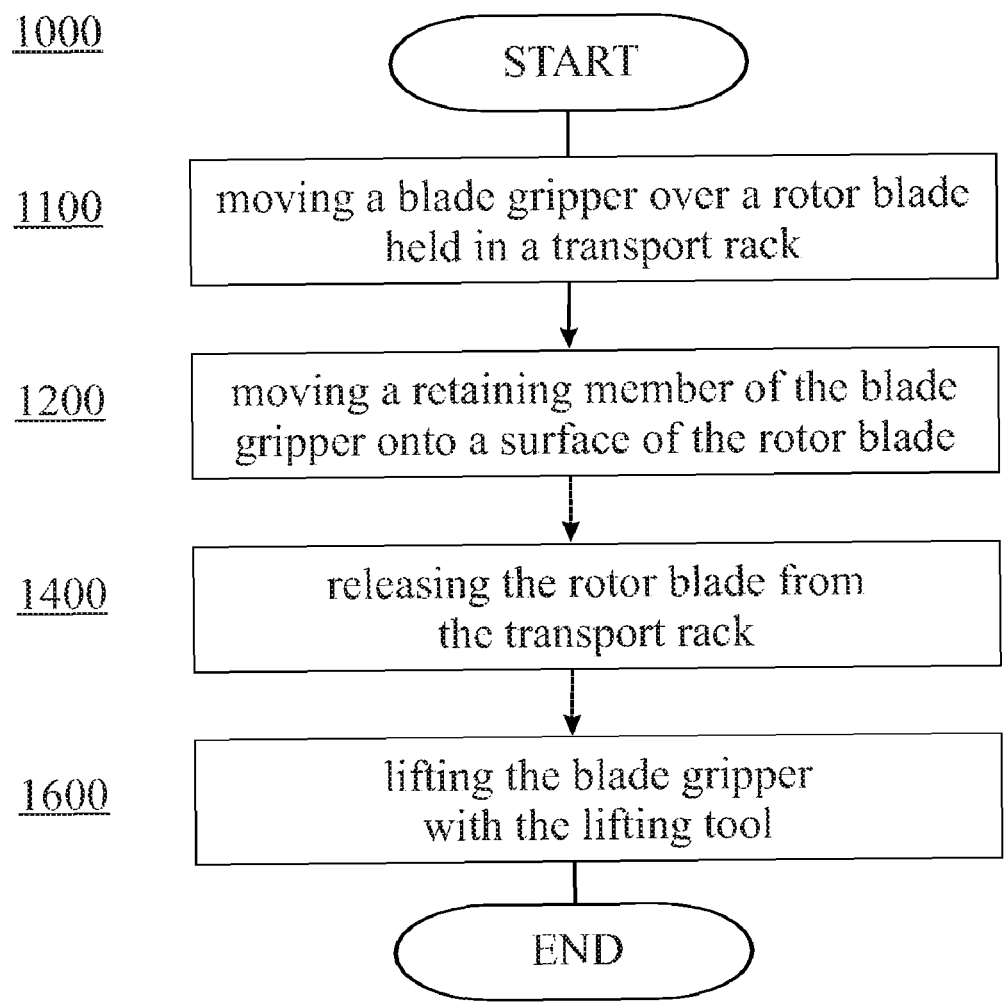
FIG. 18 illustrates a flow diagram of a method for handling a rotor blade of a wind turbine according to an embodiment.

FIG. 18 shows a flow diagram of a method 1000 for handling a rotor blade of a wind turbine according to an embodiment. In a block 1100, a blade gripper is partially moved over the rotor blade while the rotor blade is held in a transport rack, for example on a ship. The blade gripper includes a frame, typically a c-shaped frame, defining an inner space. The blade gripper may be any of the blade grippers explained with reference to FIGS. 2 to 12. Typically, the blade gripper is moved from a leading edge side of the rotor blade so that the rotor blade is supported by a blade support arranged in the inner space.

In a subsequent block 1200, a retaining member, which is movably mounted to the frame, is moved onto a surface of the rotor blade so that the rotor blade is retained within the inner space between the retaining member and the blade support. Typically, the retaining member is formed by a pad movably connected to the frame.

In subsequent blocks 1400 and 1600, the rotor blade is released from the transport rack and lifted with a lifting tool, for example a main crane. As the main crane is typically not used in block 1100, assembly time of the rotor blade may be reduced and thus costs saved compared to directly grabbing and lifting the rotor blade using the main crane.

According to an embodiment, the rotor blade is clamped between the blade support and the retaining end during lifting the blade gripper including the rotor blade so that a clamping force acting on the rotor blade is determined by the mass of the rotor blade, the mass of the blade gripper and an aerodynamic load on the blade.

Figure 19:
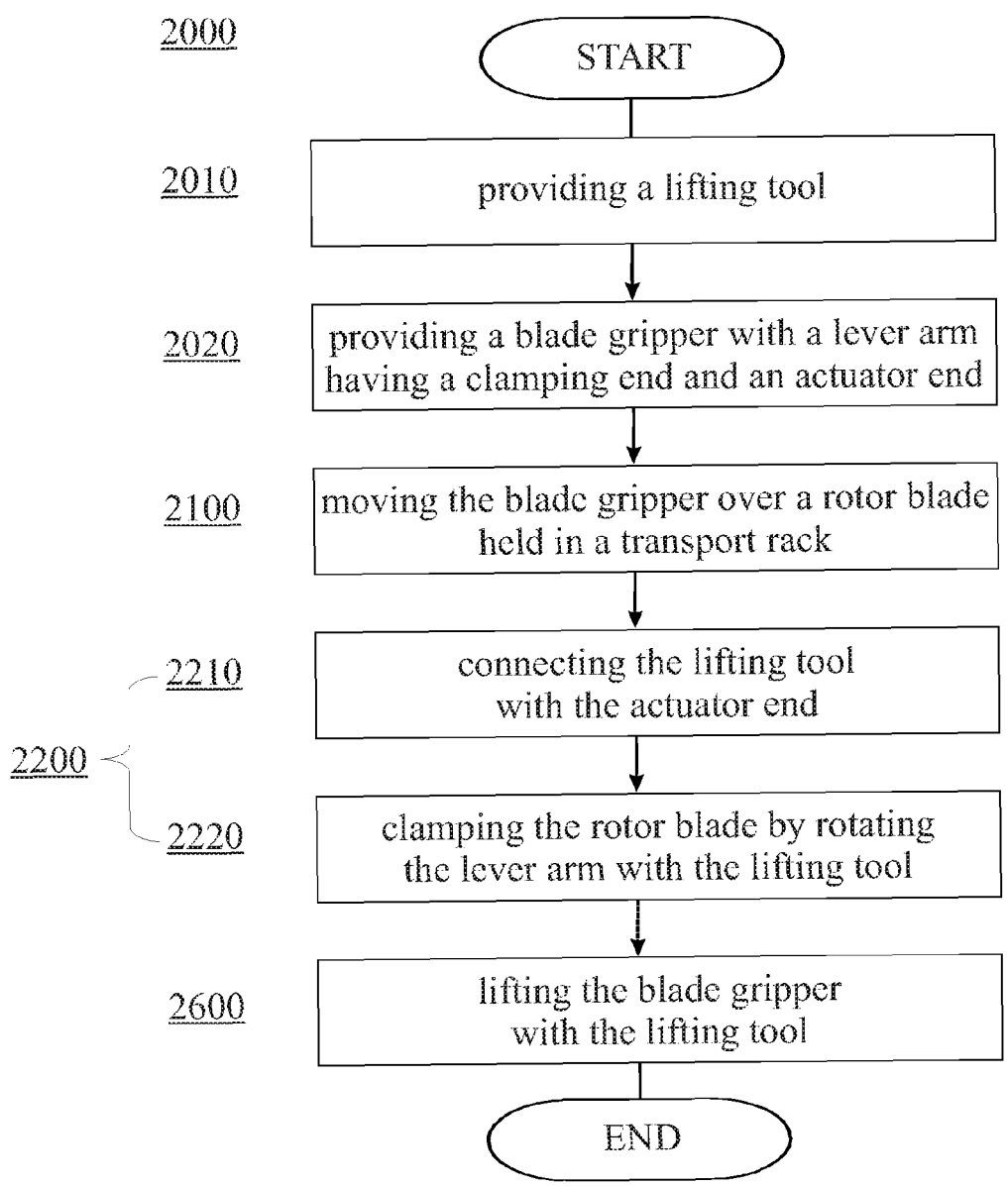
FIG. 19 illustrates a flow diagram of a method for handling a rotor blade of a wind turbine according to another embodiment.

FIG. 19 shows a flow diagram of a method 2000 for handling a rotor blade of a wind turbine according to an embodiment. In a block 2010, a lifting tool, for example a main crane, is provided. In a block 2020, a blade gripper is provided. The order of blocks 2010 and 2020 may also be reversed. The blade gripper may be any of the blade grippers explained with reference to FIGS. 2 to 12. The blade gripper includes at least a frame defining an inner space, a blade support mounted to the frame, and at least one lever arm, typically two lever arms, pivotably mounted to the frame. The at least one lever arm has a clamping end arranged in the inner space and an actuator end. In a block 2100, the blade gripper is partially moved over the rotor blade while the rotor blade is held in a transport rack so that the blade is supported by the blade support. As explained with reference to FIGS. 8, 9 and 12, arranging the rotor blade may be supported by a previously provided ramp. For example, the blade gripper may be moved via a ramp to and/or over the rotor blade held in the transport rack.

In a subsequent block 2210, the lifting tool and the actuator end of the at least one lever arm are connected by a flexible coupling member of fixed length, for example by a rope or line. Thereafter, the rotor blade is typically clamped between the blade support and the clamping end in a block 2220 by rotating the lever arm with the lifting tool. Blocks 2210 and 2220 may also be described as a single block 2200 of moving a retaining member, typically a pad, onto a surface of the rotor blade so that the rotor blade is retained within the inner space between the retaining member and the blade support.

In a subsequent block 2600, the blade gripper and the clamped blade are lifted using the lifting tool. Prior to lifting, the rotor blade is typically released from the transport rack, for example by means of the main crane.

Typically, the main crane is not used in block 2100. Accordingly, the overall time to release several rotor blades from the transport rack and lifted them to their mounting position close to the hub may be reduced at least when more than one blade gripper is used. In doing so, assembly time per rotor blade and thus the costs for manpower and the expensive work equipment may be reduced.

Figure 20:
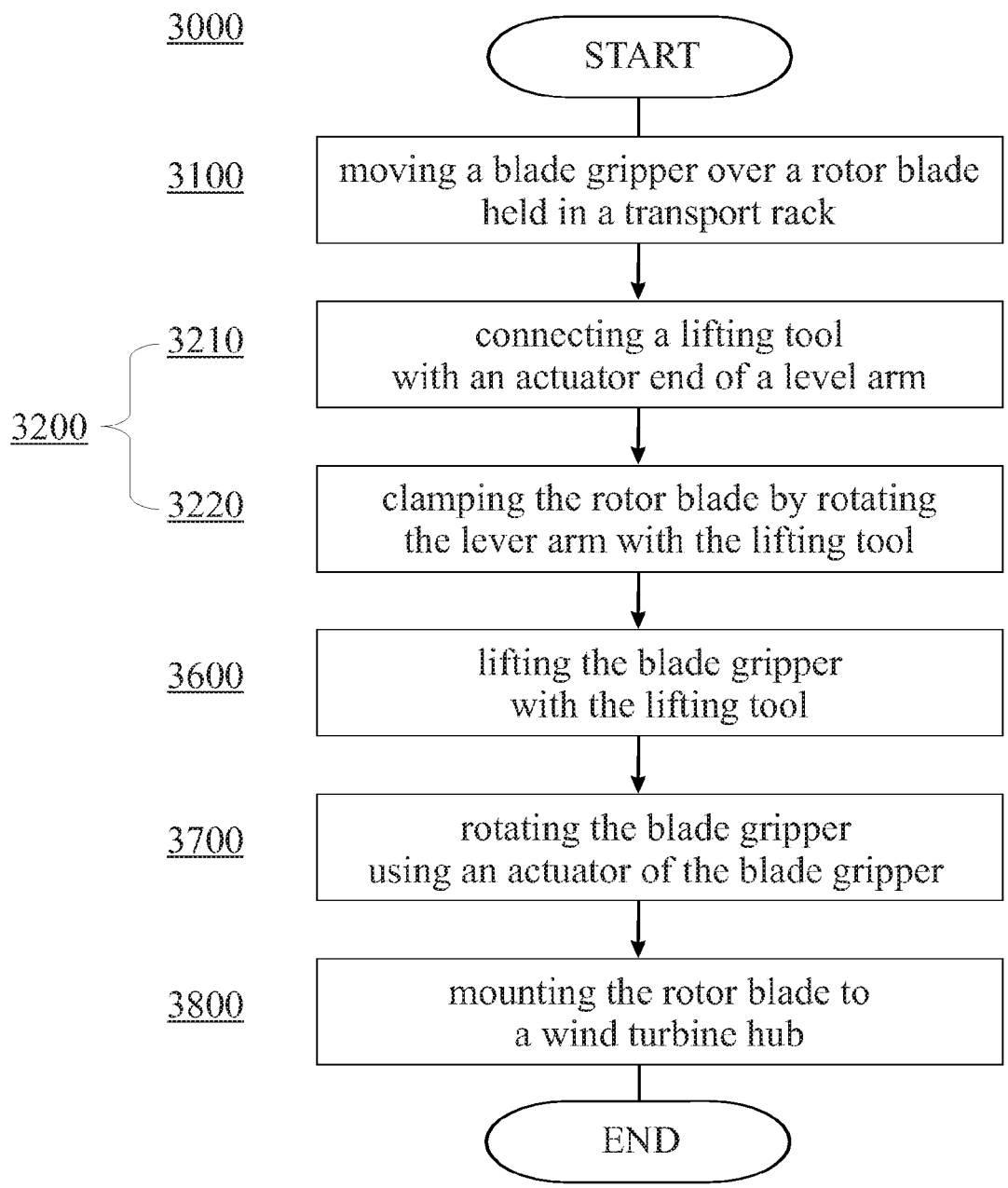
FIG. 20 illustrates a flow diagram of a method for handling a rotor blade of a wind turbine according to still another embodiment.

FIG. 20 shows a flow diagram 3000 of a method for handling a rotor blade of a wind turbine according to an embodiment. In a block 3100, a blade gripper having a frame, typically a c-shaped frame is at least partially moved over the rotor blade while the rotor blade is held in a transport rack, for example a transport rack on a ship. In doing so, the rotor blade is at least partially arranged in an inner space of the frame so that the blade is supported by a blade support mounted to the frame. A lever arm is pivotably mounted to the frame. The blade gripper may be any of the blade grippers explained with reference to FIGS. 2 to 12. Typically, the blade gripper is moved from a leading edge side of the rotor blade so that the rotor blade is supported by a blade support arranged in the inner space.

In a subsequent block 3210, the lifting tool and an actuator end of the at least one lever arm are connected by a flexible coupling member of fixed length, for example by a rope or a line. Thereafter, the rotor blade is clamped between the blade support and the clamping end in a block 3220. Clamping typically includes rotating the actuator end of the lever arm with the lifting tool. Blocks 2210 and 2220 may also be described as a single block 3200 of moving a retaining member, which is connected to the lever arm, onto a surface of the rotor blade by rotating the actuator end with a lifting tool. The retaining member is moved such that the rotor blade is retained within the inner space between the retaining member and the blade support.

In a subsequent block 3600, the blade gripper and the clamped blade are lifted using the lifting tool. In a block 3700, the blade gripper and the clamped rotor blade are rotated using an actuator mounted to the frame. This may be used to facilitate orientating the blade gripper and the clamped rotor blade relative to a wind direction during lifting and/or to facilitate orientating the blade gripper and the clamped rotor blade relative to the hub of the wind turbine prior to fastening the blade to the hub in block 3800.

Figure 21:
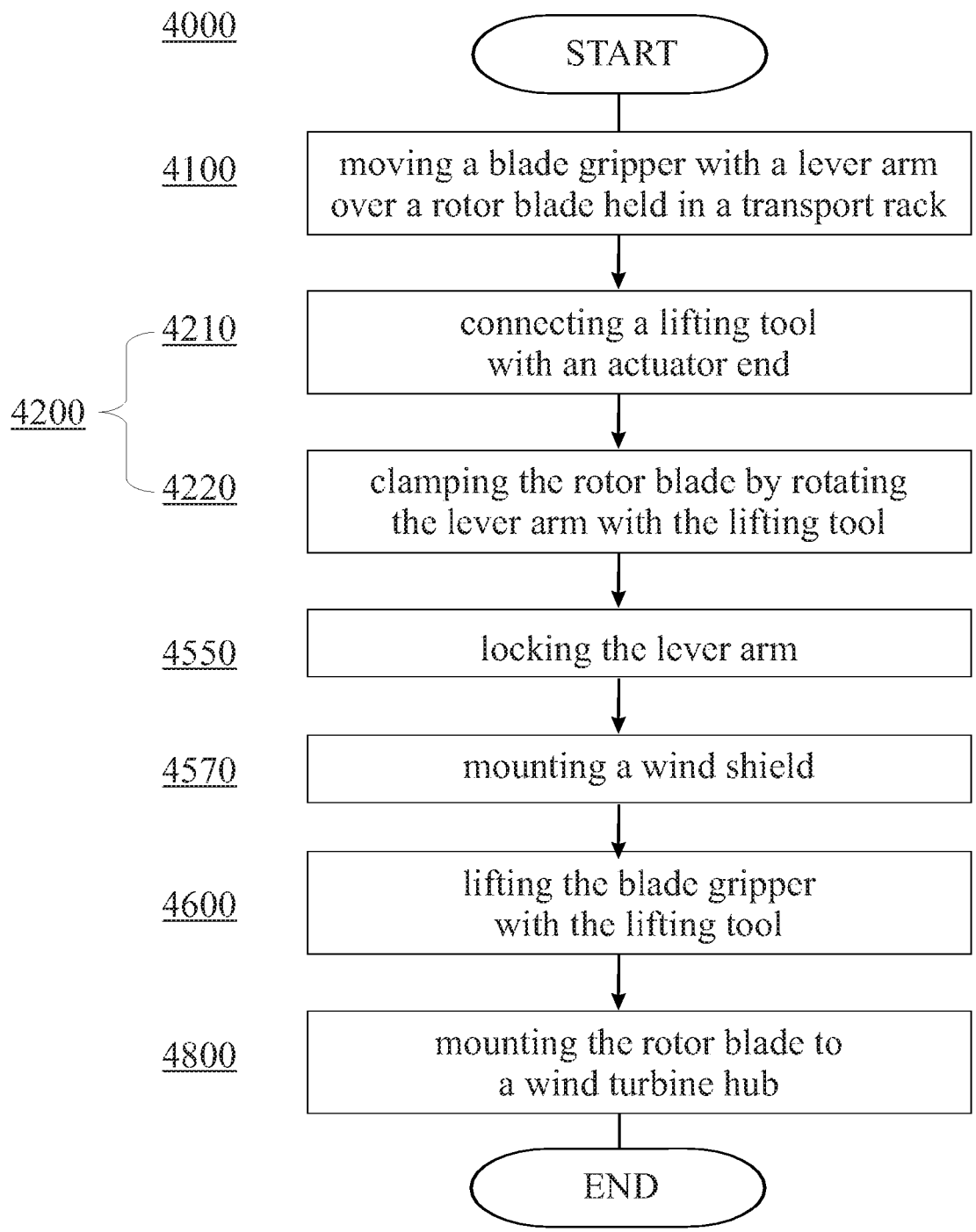
FIG. 21 illustrates a flow diagram of a method for handling a rotor blade of a wind turbine according to another embodiment.

FIG. 21 shows a flow diagram 4000 of a method for handling a rotor blade of a wind turbine according to an embodiment. In a block 4100, a blade gripper having a frame, typically a c-shaped frame, is partially moved over the rotor blade while the rotor blade is held in a transport rack. A lever arm is pivotably mounted to the frame. The blade gripper may be any of the blade grippers explained with reference to FIGS. 2 to 12. Typically, the blade gripper is moved from a leading edge side of the rotor blade so that the rotor blade is supported by a blade support arranged in the inner space.

In a subsequent block 4210, the lifting tool and the actuator end of the at least one lever arm are connected by a flexible coupling member of fixed length, for example by a rope or line. Thereafter, the rotor blade is clamped between the blade support and the clamping end in a block 4220. Clamping includes rotating the actuator end of the lever arm, typically with the lifting tool. Blocks 4210 and 4220 may also be described as a single block 4200 of moving a retaining member connected to the lever arm onto a surface of the rotor blade so that the rotor blade is retained within the inner space between the retaining member and the blade support.

In a subsequent block 4550, the lever arm is locked in the clamping position or clamping orientation. In a block 4570, a wind shield is mounted to the frame. Accordingly, aerodynamic loads and/or the variation of aerodynamic loads during lifting and/or subsequent mounting of the rotor blade may be reduced. In a subsequent block 3600, the blade gripper and the clamped blade are lifted using the lifting tool. Thereafter, the rotor blade is mounted to the hub of the wind turbine.

The methods for handling a rotor blade as explained with reference to FIGS. 18 to 21 may additionally include, prior to lifting the rotor blade, an additional process of detachably attaching a flexible alignment aid to a root section of the rotor blade, as explained with reference to FIGS. 13 to 17. Furthermore, the method for handling a rotor blade may include a process grabbing the alignment aid from inside the nacelle, a process of aligning the rotor blade using the flexible alignment aid, and a subsequent process of removing the flexible alignment aid from the root section of the rotor blade.

Exemplary embodiments of systems and methods for handling wind turbine rotor blades are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for handling a rotor blade of a wind turbine, the device comprising:
   a frame defining an inner space for at least partially accommodating the rotor blade;
   a blade support arranged in the inner space and mounted to the frame, the blade support comprising at least one support element comprising a moveable joint; and
   a first lever arm pivotably mounted to the frame, the first lever arm comprising a retaining end arranged in the inner space and an actuator end which is movable to rotate the first lever arm so that the rotor blade is retained between the blade support and the retaining end.

2. The device of claim 1, further comprising a holding unit connectable to a lifting tool, a first actuator, and a first flexible coupling member connecting the holding unit and the first actuator, wherein the first actuator is configured to change a length of the first flexible coupling member between the holding unit and the first actuator.

3. The device of claim 2, wherein the first flexible coupling member comprises a first portion and a second portion, the first portion connecting the holding unit and the first actuator, and the second portion having a fixed length and connecting the holding unit and the actuator end, and wherein the first actuator is configured to change a length of the first portion.

4. The device of claim 2, further comprising a second flexible coupling member of a fixed length connecting the holding unit and the actuator end.

5. The device of claim 4, further comprising a third flexible coupling member, a second actuator, and a second lever arm pivotably mounted to the frame, the second lever arm comprising a retaining end arranged in the inner space and an actuator end connected with the holding unit, wherein the second actuator is configured to change a length of the third flexible coupling member connecting the second actuator and the actuator end of the second lever arm via the holding unit or to change a length of a portion of the third flexible coupling member connecting the second actuator and the holding unit.

6. The device of claim 5, wherein at least one of the first flexible coupling member, the second flexible coupling member, and the third flexible coupling member is selected from a group consisting of a line, a rope, a cable and a chain.

7. The device of claim 1, further comprising at least one of:
   a first pad mounted to the retaining end; and
   at least a second pad mounted to the frame and forming at least a part of the blade support.

8. The device of claim 1, further comprising at least one of:
a wind shield mounted to the frame;
a rail arranged on the frame; and
at least one wheel arranged below the frame.

9. A lifting system for handling a rotor blade of a wind turbine, the lifting system comprising:
a lifting tool; and
a handling device comprising:
a frame defining an inner space for at least partially accommodating the rotor blade;
a blade support mounted to the frame, the blade support comprising at least one support element comprising a moveable joint; and
a first lever arm pivotably mounted to the frame, the first lever arm comprising a clamping end arranged in the inner space and an actuator end connected to the lifting tool so that the rotor blade is clamped between the blade support and the clamping end when the lifting tool lifts the handling device.

10. The lifting system of claim 9, further comprising a holding unit, an actuator mounted to the frame, a flexible coupling member comprising a first portion and a second portion, the first portion connecting the holding unit and the actuator, the second portion having a fixed length and connecting the actuator end and the holding unit, wherein the actuator is configured to change a length of the first portion.

11. The lifting system of claim 9, further comprising a holding unit, a first actuator mounted to the frame, a first flexible coupling member and a second flexible coupling member, the first flexible coupling member connecting the holding unit and the first actuator, the second flexible coupling member having a fixed length and connecting the actuator end and the holding unit, wherein the first actuator is configured to change a length of the first flexible coupling member.

12. The lifting system of claim 11, wherein the lifting system is configured to rotate the handling device about an axis lying in a vertical plane crossing the frame by changing the length of the first flexible coupling member with the first actuator.

13. The lifting system of claim 12, wherein the handling device further comprises a second actuator mounted to the frame and a second lever arm pivotably mounted to the frame, the second lever arm comprising a clamping end arranged in the inner space and an actuator end connected to the holding unit with a third flexible coupling member which also connects the holding unit and the second actuator, wherein the second actuator is configured to change a length of the third flexible coupling member.

14. The lifting system of claim 13, wherein the lifting system is configured to rotate the axis by changing the length of the third flexible coupling member with the second actuator.

15. The lifting system of claim 9, further comprising a wind shield mounted to the frame.

16. A device for handling a rotor blade of a wind turbine, the device comprising:
a frame defining an inner space for at least partially accommodating the rotor blade;
a blade support arranged in the inner space and mounted to the frame;
a wind shield mounted to the frame; and
a first lever arm pivotably mounted to the frame, the first lever arm comprising a retaining end arranged in the inner space and an actuator end which is movable to rotate the first lever arm so that the rotor blade is retained between the blade support and the retaining end.

17. The device of claim 16, further comprising a holding unit connectable to a lifting tool, a first actuator, and a first flexible coupling member connecting the holding unit and the first actuator, wherein the first actuator is configured to change a length of the first flexible coupling member between the holding unit and the first actuator.

18. The device of claim 17, wherein the first flexible coupling member comprises a first portion and a second portion, the first portion connecting the holding unit and the first actuator, and the second portion having a fixed length and connecting the holding unit and the actuator end, and wherein the first actuator is configured to change a length of the first portion.

19. The device of claim 17, further comprising a second flexible coupling member of a fixed length connecting the holding unit and the actuator end.

20. The device of claim 19, further comprising a third flexible coupling member, a second actuator, and a second lever arm pivotably mounted to the frame, the second lever arm comprising a retaining end arranged in the inner space and an actuator end connected with the holding unit, wherein the second actuator is configured to change a length of the third flexible coupling member connecting the second actuator and the actuator end of the second lever arm via the holding unit or to change a length of a portion of the third flexible coupling member connecting the second actuator and the holding unit.

* * * * *